(12) United States Patent
Matsumoto et al.

(10) Patent No.: US 7,770,828 B2
(45) Date of Patent: Aug. 10, 2010

(54) METHOD OF MANUFACTURING RESIN PARTICLES

(75) Inventors: Katsuru Matsumoto, Nara (JP); Keiichi Kikawa, Osaka (JP); Ayae Nagaoka, Uji (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 452 days.

(21) Appl. No.: 11/937,547

(22) Filed: Nov. 9, 2007

(65) Prior Publication Data

US 2009/0020899 A1    Jan. 22, 2009

(30) Foreign Application Priority Data

Nov. 9, 2006  (JP)  .............................. P2006-304557
Sep. 3, 2007  (JP)  .............................. P2007-228357

(51) Int. Cl.
*B02C 23/00* (2006.01)
(52) U.S. Cl. .............................. 241/16; 241/21; 241/29
(58) Field of Classification Search .................... 241/16, 241/21, 29, 261.1
See application file for complete search history.

(56) References Cited

U.S. PATENT DOCUMENTS 5,566,888 A * 10/1996 Yamamoto .................... 241/3
2005/0041523 A1   2/2005 Nakano

FOREIGN PATENT DOCUMENTS

| JP | 2005-024861 | 1/2005 |
| JP | 2005-173263 | 6/2005 |
| WO | 03/059497 | 7/2003 |

* cited by examiner

*Primary Examiner*—Dana Ross
*Assistant Examiner*—Matthew G Katcoff
(74) *Attorney, Agent, or Firm*—Nixon & Vanderhye, P.C.

(57) ABSTRACT

Method of manufacturing resin particles capable of manufacturing resin particles of controlled particle size stably and efficiently by removing bubbles from the surface of a molten kneaded product as the raw material for resin particles thereby sufficiently ensuring action sites for a surfactant on the surface of the molten kneaded product, is provided. The method includes a coarsely-pulverizing step of pressurizing a mixture of a molten kneaded product containing a synthetic resin and an aqueous medium containing a surfactant to 15 MPa to 120 MPa thereby removing bubbles attached to the molten kneaded product containing the synthetic resin, and a finely-granulating step of finely granulating, by a high pressure homogenizer method, an aqueous slurry containing coarse particles of a molten kneaded product passing through a pressure proof nozzle in the coarsely-pulverizing step and in a state where bubbles attached to the surface are removed.

6 Claims, 12 Drawing Sheets

METHOD OF MANUFACTURING RESIN PARTICLES

CROSS-REFERENCE TO RELATED APPLICATION

This application claims priority to Japanese Patent Application Nos. 2006-304557, which was filed on Nov. 9, 2006, and 2007-228357, which was filed on Sep. 3, 2007, the contents of which are incorporated herein by reference in its entirety.

BACKGROUND OF THE INVENTION

1. Field of the Invention

The present invention relates to a method of manufacturing resin particles.

2. Description of the Related Art

An image forming apparatus for forming images electrophotographically includes a photoreceptor, a charging section, an exposure section, a developing section, a transfer section, a fixing section, and a cleaning section. The charging section charges the surface of the photoreceptor. The exposure section irradiates a signal light to the surface of the photoreceptor in a charged state to form static latent images corresponding to image information. The developing section supplies a toner in a developer to the static latent images formed on the surface of the photoreceptor to develop the static latent images thereby forming toner images. The transfer section transfers toner images formed on the surface of the photoreceptor to a recording material. The fixing section fixes the transferred toner images to the recording material. The cleaning section cleans the surface of the photoreceptor after transfer of the toner images. In such an image forming apparatus, static latent images are developed by using a one-component developer containing a toner, or a two-component developer containing a toner and a carrier as the developer to form images. The toner used herein is a resin particles formed by dispersing and granulating a colorant and a wax as a release agent in a binder resin as a matrix.

Since the image-forming apparatus using the electrophotographic system can form images of good image quality at a high speed and a reduced cost, it is utilized, for example, in copying machines, printers, and facsimile units and recent popularization of the image forming apparatus in an electrophotographic manner is remarkable. In accordance with this, severer demands are directed to the image forming apparatus. Particularly, it has been particularly considered important for images formed by the image forming apparatus higher fineness, higher resolution and stabilization of image quality and increased image forming speed. For attaining them, it is indispensable to investigate from both the aspects of image forming process and developer.

For higher finesses and higher resolution of images, reduction of size of toner particles is one of the subjects to be solved from a view point that accurate reproduction of static latent images is important with respect to the developer. As a method of manufacturing toner particles of a reduced diameter, an emulsifying aggregation method has been known for instance. In the emulsifying aggregation method, toner particles are manufactured by forming resin particles containing a resin binder, a colorant, and a release agent, etc in an aqueous medium such as water and aggregating the resin particles.

The emulsifying aggregation method includes, for example, a melt kneading emulsifying aggregation method. In the melt kneading emulsifying aggregation method, a raw material containing a resin binder, a colorant a release agent, etc. is at first melt kneaded, and the molten kneaded product is cooled to solidify. Then, the solidified molten kneaded product is pulverized, charged in an aqueous medium and then stirred in the aqueous medium, whereby a pulverizate of the molten kneaded product is dispersed in the aqueous medium to obtain resin particles. In this case, bubbles are generated by stirring by a stirring section and the generated bubbles are sometimes attached to the surface of the pulverizate of the molten kneaded product. When the bubbles are attached to the surface of the pulverizate of the molten kneaded product, a surfactant for dispersing the pulverizate of the molten kneaded product into the aqueous medium cannot act on the surface of the pulverizate of the molten kneaded product to result in a problem that the pulverizate of the molten kneaded product cannot be dispersed sufficiently in the aqueous medium.

In view of the problem described above, a method of manufacturing a toner with an aim of preventing the generation of bubbles is proposed (refer, for example, to Japanese Unexamined Patent Publication JP-A 2005-173263). In the technique disclosed in JP-A 2005-173263, a liquid dispersion as an aqueous medium containing a dispersoid containing a toner raw material is applied with a deaerating treatment of deaerating the liquid dispersion by using a depressurizing method of putting the liquid dispersion in an atmosphere, preferably, at 80 kPa or lower and, more preferably, from 0.1 to 40 kPa, and then the liquid dispersion is jetted from a discharging aperture at a diameter of about from 5 to 500 μm to finely granulate the dispersoid. The method of manufacturing the toner disclosed in JP-A 2005-173263 is, a technique of removing bubbles and gases dissolved in the liquid dispersion by applying the deaerating treatment.

However, in the method of manufacturing the toner disclosed in JP-A 2005-173263, since energy applied in the deaerating treatment is small, it result in a problem that bubbles and dissolved gases cannot sufficiently be removed from the aqueous medium. For the bubbles, while macro bubbles that can be recognized, for example, by visual observation can be removed, smaller micro bubbles cannot be sufficiently removed from the surface of the dispersoid. In a case where the micro bubbles cannot be removed from the surface of the dispersoid, the action sites of the surfactant at the surface of the dispersoid are decreased, and fine granulation and particle size control cannot be conducted by the dispersion of the dispersoid in the aqueous medium.

In a case where the bubbles or the dissolved gases are present in the aqueous medium, the bubbles or dissolved gases generate cavitation (hereinafter occasionally referred to as "cavitation phenomenon") to generate bubbles in the aqueous medium. Since the portion where bubbles are generated is at a lower pressure than that at the periphery thereof, an energy due to external force for fine granulation is consumed for crushing the generated bubbles. Accordingly, the external force cannot be applied effectively to the dispersoid and no sufficient fine granulation can be conducted. Further, in a case where a dispersoid, particularly, a dispersoid at micron to sub-micron size is finely granulated in the aqueous medium by applying external force, when bubbles are attached to the surface of the dispersoid, since the surfactant cannot wet the dispersoid, no sufficient fine granulation can be conducted when the dispersoid is finely granulated by applying external force in an aqueous medium.

SUMMARY OF THE INVENTION

An object of the invention is to provide a method of manufacturing resin particles by finely granulating a molten kneaded product with addition of external force in an aqueous medium, in which method bubbles are removed from a surface of the molten kneaded product as a raw material for the resin particles, the action site of a surfactant on the surface of the molten kneaded product is sufficiently ensured and the external force is efficiently provided to the molten kneaded product for fine granulation.

The invention provides a method of manufacturing resin particles, comprising:

a coarsely-pulverizing step of pressurizing a mixture of a molten kneaded product containing a synthetic resin and an aqueous medium containing a surfactant at 15 MPa to 120 MPa and obtaining an aqueous slurry containing coarse particles of the molten kneaded product; and a finely-granulating step of treating the aqueous slurry containing coarse particles of the molten kneaded product obtained in the coarsely-pulverizing step by a high pressure homogenizer method and finely granulating the coarse particles of the molten kneaded product.

According to the invention, in the coarsely-pulverizing step, the mixture of the molten kneaded product containing the synthetic resin and the aqueous medium containing the surfactant is pressurized to 15 MPa to 120 MPa to obtain an aqueous slurry containing coarse particles of the molten kneaded product (hereinafter occasionally referred to as "slurry"). Then, in the finely-granulating step, the slurry containing the coarse particles of the molten kneaded product obtained in the coarsely-pulverizing step is treated by a high pressure homogenizer method and the coarse particles of the molten kneaded product is finely granulated. In the coarsely-pulverizing step, bubbles attached to the surface of the molten kneaded product containing the synthetic resin can be removed efficiently by pressurizing the mixture to 15 MPa to 120 MPa. By the removal of the bubbles attached to the surface of the molten kneaded product containing the synthetic resin, when the molten kneaded product is finely granulated by the addition of external force by the high pressure homogenizer in the finely-granulating step, action sites of the surfactant at the surface of the molten kneaded product can be ensured sufficiently. Further, the external force can be provided efficiently to the molten kneaded product for fine granulation. Accordingly, resin particles of a small particle size controlled for the particle size can be manufactured stably and effectively.

Furthermore, in the invention, it is preferable that the method of manufacturing resin particles further comprises a defoaming step of defoaming the mixture of the molten kneaded product containing the synthetic resin and the aqueous medium containing the surfactant before the coarsely-pulverizing step such that the amount of dissolved oxygen is reduced to 7.5 mg/L or less.

According to the invention, the mixture of the molten kneaded product containing the synthetic resin and the aqueous medium containing the surfactant is defoamed before the coarsely-pulverizing step such that the amount dissolved oxygen in the mixture is 7.5 mg/L or less in the defoaming step. In a case of preparing micron to sub-micron particles by applying external force in a liquid, when bubbles or dissolved gases are present in the liquid, they form sites for the occurrence of cavitation and since energy is consumed therein, external force cannot be applied effectively to the material to be treated. Further, in a case where the bubbles are deposited on the surface of the material to be treated, since it is not sufficiently wetted with the surfactant, pulverization and fine granulation become difficult. In a case where the amount of dissolved oxygen in the mixture obtained by the defoaming step is 7.5 mg/L or less, since bubbles or dissolved gases are released sufficiently, external force can be provided more effectively to the molten kneaded product in the mixture in the subsequent coarsely-pulverizing step and finely-granulating step compared with the case where the amount of dissolved oxygen in the mixture exceeds 7.5 mg/L. Accordingly, the molten kneaded product can be efficiently pulverized and finely granulated and resin particles can be produced while greatly shortening the processing time required for pulverization and fine granulation. Further, since the amount of the bubbles in the liquid is small, the dispersant is not consumed wastefully, for example, in a case of coarsely pulverizing the mixture with addition of the dispersant in the coarsely-pulverizing step, which also results in the reduction for the amount of the dispersant.

Furthermore, in the invention, it is preferable that the method of manufacturing resin particles further comprises a preliminarily-pulverizing step of obtaining an aqueous slurry containing a molten kneaded product pulverized by preliminarily pulverizing the mixture of the molten kneaded product containing the synthetic resin and the aqueous medium containing the surfactant before the defoaming step such that the particle size of the molten kneaded product is reduced to 500 μm or less.

According to the invention, the mixture of the molten kneaded product containing the synthetic resin and the aqueous medium containing the surfactant is preliminarily pulverized in the preliminarily-pulverizing step before the coarsely-pulverizing step such that the particle size of the molten kneaded product is reduced to 500 μm or less. In view of the structure of the high pressure homogenizer used in the finely-granulating step, a material to be treated, for example, the molten kneaded product containing the synthetic resin cannot pass the nozzle of a small diameter in the high pressure homogenizer unless the material to be treated has a size of about sub-micron or less. By way of the preliminarily-pulverizing step, an aqueous slurry not containing coarse particles of the molten kneaded product with the particle size in excess of 500 μm can be obtained and coarse pulverization and fine granulation for the material to be treated can be conducted smoothly with no occurrence of clogging in the small diameter nozzle in the high pressure homogenizer in the subsequent coarsely-pulverizing step and the finely-granulating step.

Furthermore, in the invention, it is preferable that a viscosity improver is added to the mixture in the preliminarily-pulverizing step and the mixture is preliminarily pulverized.

According to the invention, preliminary pulverization is conducted with addition of a viscosity improver to the mixture of the molten kneaded product containing the synthetic resin and the aqueous medium containing the surfactant in the preliminarily-pulverizing step. Addition of the viscosity improver provides an effect of further fine granulation of the molten kneaded product containing the synthetic resin and the treating efficiency in the coarsely-pulverizing step and the finely-granulating step can be improved. Further, by adding, for example, a viscosity improver which is less dispersible in aqueous medium such as xanthane gum in the preliminarily-pulverizing step, since the viscosity improver can be dispersed uniformly in the mixture of the molten kneaded product containing the synthetic resin and the aqueous medium containing the surfactant before the coarsely-pulverizing step and the finely-granulating step, the treating efficiency in the coarsely-pulverizing step and the finely-granulating step can be improved.

Furthermore, in the invention, it is preferable that the mixture is preliminarily pulverized in the preliminarily-pulverizing step with a colloid mill having a rotor member disposed so as to rotate about predetermined rotational axis thereof and a stator member surrounding the rotor member circumferentially in such a manner that the mixture is caused to pass through a gap between the stator member and the rotor member.

According to the invention, a colloid mill having a rotor member disposed so as to rotate about a predetermined rotational axis and a stator member surrounding the rotor member circumferentially is used to preliminarily pulverize the mixture in the preliminarily-pulverizing step, by passing the mixture of the molten kneaded product containing the synthetic resin and the aqueous medium containing the surfactant between the stator member and the rotor member of the colloid mill. By passing the mixture of the molten kneaded product containing the synthetic resin and the aqueous medium containing the surfactant through the gap between the stator member and the rotor member, the molten kneaded product containing the synthetic resin can be preliminarily pulverized efficiently and in a relatively short time such that the particle size is reduced to 500 µm or less. Further, deposition of the bubbles to the surface of the preliminary pulverizate of the molten kneaded product can be suppressed as much as possible in the preliminarily-pulverizing step. Further, the shape of the preliminary pulverizate of the synthetic resin after the preliminarily-pulverizing step can be made uniform to narrow the particle size distribution width.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
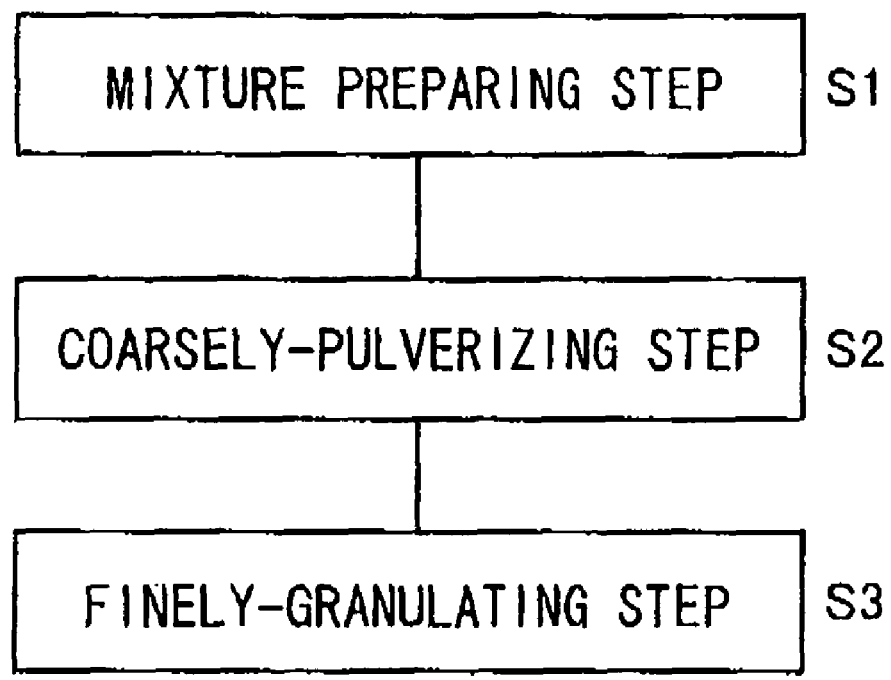
FIG. 1 is a flow chart showing a method of manufacturing resin particles according to one embodiment of the invention.

Now referring to the drawings, preferred embodiments of the invention are described below.

A method of manufacturing resin particles according to one embodiment of the invention includes a coarsely-pulverizing step of pressurizing a mixture of a molten kneaded product containing a synthetic resin and an aqueous medium containing a surfactant (hereinafter also referred to simply as "mixture") to 15 MPa to 120 MPa to obtain an aqueous slurry containing a coarse particle of the molten kneaded product (hereinafter also referred to as "coarse pulverizate liquid dispersion"), and a finely-granulating step of treating the aqueous slurry containing the coarse particle of the molten kneaded product obtained in the coarsely-pulverizing step by a high pressure homogenizer method and finely granulating the coarse particles of the molten kneaded product.

FIG. 1 is a flow chart showing a method of manufacturing resin particles. The method of manufacturing resin particles shown in FIG. 1 includes a mixture preparing step of step S1, a coarsely-pulverizing step of step S2, and a finely-granulating step of step S3.

[Mixture Preparing Step]

In the mixture preparing step of step S1, a molten kneaded product containing the synthetic resin is prepared, and a mixture of the molten kneaded product and the aqueous medium containing the surfactant is prepared. In this case, the synthetic resin may contain one or more additives for synthetic resin. The molten kneaded product of the synthetic resin can be manufactured, for example, by melt-kneading a synthetic resin and, optionally, a synthetic resin containing one or more additives for the synthetic resin, cooling, solidifying and then pulverizing the melt-kneaded product.

The melt-kneading is conducted, for example, by dry mixing a synthetic resin and, optionally, one or more additives for synthetic resin in a mixer and kneading the obtained powder mixture in a kneader. The kneading temperature is at a ½ softening temperature or higher of the synthetic resin (usually about from 80 to 200° C., preferably, about from 100 to 150° C.).

Known mixers can be used and include, for example, Henschel type mixing apparatus such as Henschel mixer (trade name of products, manufactured by Mitsui Mining Co.), super mixer (trade name of products, manufactured by Kawata Co.), Mechanomil (trade name of products, manufactured by Okada Seiko Co.), Ong mill (tradename of products, manufactured by Hosokawa Micron Co.), Hybridization System (trade name of products, manufactured by Nara Machinery Co., Ltd.), and Cosmo System (tradename of products, manufactured by Kawasaki Heavy Industry Co.)

Known kneaders can be used and general kneaders such as twin screw extruders, three rolls and laboplast mills can be used. More specifically, they include single shaft or double screw extruders such as TEM-100B (trade name of products, manufactured by Toshiba Machine Co.) and PCM-65/87, PCM-30 (each trade name of products, manufactured by Ikegai Co.) and open roll type kneaders such as Kneadex (trade name of products, manufactured by Mitsui Mining Co.). Among them, the open roll type kneaders are preferred.

The solidified product is obtained by cooling the kneaded product. A powder pulverizing machine such as a cutter mill, feather mill, or jet mill is used for the pulverization of the solidified product. This can provide a coarse particle of the synthetic resin. In this embodiment, the pulverizate obtained by solidifying and pulverizing the melt-kneaded synthetic resin is referred to as the molten kneaded product. In the particle size of the coarse particle is not particularly restricted and it is preferably from 450 to 1,000 µm, and more preferably, from 500 to 800 µm. The solidified product may be applied with pulverizing treatment by a pulverizing device in the preliminarily-pulverizing step of step Sa to be described later without conducting the cooling treatment and the pulverizing treatment by the powder mill after kneading. For example, in a case of kneading the powder mixture by an open roll type kneader, since the powder mixture is rapidly cooled by a cooling roll on the discharging side of the open roll type kneader, and cooled to about 35° C. to 40° C. about at the instance discharged from the open roll type kneader and discharged as a molten kneaded product also applied with pulverization, it is served for the preliminarily-pulverizing step without cooling and pulverizing treatment after kneading.

The synthetic resin is not particularly restricted so long as the resin can be granulated in a molten state and includes, for example, polyvinyl chloride, polyvinyl acetate, polyethylene, polypropylene, polyester, polyamide, styrenic polymer, (meth)acrylic resin, polyvinyl butyral, silicone resin, polyurethane, epoxy resin, phenol resin, xylene resin, rosin-modified resin, terpene resin, aliphatic hydrocarbon resin, cycloaliphatic hydrocarbon resin, and aromatic petroleum resin. The synthetic resin can be used alone or two or more of them may be used in combination. Among them, polyester, styrenic polymer, (meth)acrylic resin, polyurethane, and epoxy resin capable of easily providing particles having a high surface smoothness by wet-granulating in an aqueous system are preferred.

As the polyester, known materials can be used including, for example, polycondensates of polybasic acids and polyhydric alcohols. The polybasic acids can use those known as monomers for polyesters and include, for example, aromatic carboxylic acids such as terephthalic acid, isophthalic acid, phthalic acid anhydride, trimellitic acid anhydride, pyromellitic acid, and naphthalene carboxylic acid; aliphatic carboxylic acids such as maleic acid anhydride, fumaric acid, succinic acid, alkenyl succinic acid anhydride, and adipic acid; and methyl esterification products of such polybasic acids. The polybasic acid may be used alone or two or more of them may be used in combination. The polyhydric alcohol can also use those known as monomers for polyester and include, for example, aliphatic polyhydric alcohols such as ethylene glycol, propylene glycol, butane diol, hexane diol, neopentyl glycol and glycerin; cycloaliphatic polyhydric alcohols such as cyclohexane diol, cyclohexane dimethanol, and hydrogenated bisphenol A; and aromatic diols such as an ethylene oxide adduct of bisphenol A and a propylene oxide adduct of bisphenol A. The polyhydric alcohol may be used alone or two or more of them may be used in combination.

The polycondensating reaction of the polybasic acid and the polyhydric alcohol can be carried out in accordance with a customary method, for example, carried out by contacting a polybasic acid and a polyhydric alcohol under the presence or absence of an organic solvent and under the presence of a polycondensation catalyst, which is completed when the acid value, the softening temperature and the like of the resultant polyester reach predetermined values. Thus, a polyester is obtained. In a case of using a methyl esterification product of a polybasic acid to a portion of the polybasic acid, de-methanol polycondensating reaction is conducted. In the polycondensating reaction, by properly changing the blending ratio, the reaction rate, etc. of the polybasic acid and the polyhydric alcohol, the carboxylic group content at the terminal end of the polyester can be controlled, for example, and thus the physical property of the obtained polyester can be modified. Further, in a case of using trimellitic acid anhydride as the polybasic acid, a modified polyester is obtained also by easily introducing a carboxylic group in the main chain of the polyester. A self-dispersible polyester provided with the dispersibility in an aqueous medium by bonding a hydrophilic group such as a carboxyl group or a sulfonic acidic group in the main chain and/or on the side chain of the polyester can also be used.

The styrenic polymer includes, for example, homopolymers of styrenic monomers, and copolymers of styrenic monomers and monomers copolymerizable with the styrenic monomers. The styrenic monomer includes, for example, styrene, o-methylstyrene, ethylstyrene, p-methoxystyrene, p-phenyl styrene, 2,4-dimethyl styrene, p-n-octylstyrene, p-n-decyl styrene and p-n-dodecyl styrene. The monomer copolymerizable with the styrenic monomer includes (meth) acrylates such as methyl (meth)acrylate, ethyl (meth)acrylate, propyl (meth)acrylate, butyl (meth)acrylate, isobutyl (meth)acrylate, n-octyl (methacrylate, dodecyl (meth) acrylate, 2-ethylhexyl (meth)acrylate, stearyl (meth)acrylate, phenyl (meth)acrylate, and dimethyl aminoethyl (meth)acrylate; (meth) acrylic monomers such as acrylonitrile, methacryl amide, glycidyl methacrylate, N-methylol acrylamide, N-methylol methacrylamide, and 2-hydroxyethyl acrylate; vinyl ethers such as vinylmethyl ether, vinylethyl ether, and vinyl isobutyl ether; vinyl ketones such as vinyl methyl ketone, vinyl hexyl ketone, and methyl isopropenyl ketone; and N-vinyl compounds such as N-vinyl pyrrolidone, N-vinyl carbazol, and N-vinyl indole. The styrenic monomer and the monomer copolymerizable with the styrenic monomer can be used each alone or two or more of them can be used in combination respectively. The (meth)acrylate include acrylate and methacrylate.

The (meth)acrylic resin includes, for example, homopolymers of (meth)acrylates and copolymers of (meth)acrylates and monomers copolymerizable with the (meth)acrylates. As the (meth)acrylates identical with those described above can be used. The monomers copolymerizable with the (meth) acrylates include, for example, (meth)acrylic monomers, vinyl ethers, vinyl ketones, and N-vinyl compounds. The monomers those identical with describe above can be used. As the (meth)acrylic resin, acidic group-containing acrylic resins can also be used. The acidic group containing acrylic resin can be produced, for example, by using an acrylic resin monomer containing an acidic group or hydrophilic group and/or a vinylic monomer having an acidic group or a hydrophilic group in combination upon polymerizing an acrylic resin monomer or an acrylic resin monomer and a vinylic monomer. Known acrylic resin monomers can be used and they include, for example, acrylic acid which may have a substituent, methacrylic acid which may have a substituent, an acrylate which may have a substituent, and a methacrylate which may have a substituent. The acrylic resin monomers may be used each alone or two or more of them may be used in combination. Known vinylic monomer can be used and they include, for example, styrene, α-methyl styrene, vinyl bromide, vinyl chloride, vinyl acetate, acrylonitrile, and methacryl nitrile. The vinylic monomers may be used each alone or two or more of them may be used in combination. Polymerization of the styrenic polymer and (meth) acrylic resin is carried out generally by using a radical initiator by solution polymerization, suspension polymerization, emulsification polymerization, and the like.

Polyurethane is not particularly restricted and, for example, acidic group or basic group-containing polyurethanes can be used preferably. The acidic group or basic group-containing polyurethanes can be used in accordance with known methods. For example, an acidic group or basic group-containing diol, polyol, and polyisocyanate may be put to addition polymerization. The acidic group or basic group-containing diol includes, for example, dimethylol propionic acid and N-methyldiethanol amine. The polyol includes, for example, polyether polyol such as polyethylene glycol; polyester polyol; acrylopolyol; and polybutadiene polyol. The polyisocyanate includes, for example, tolylene diisocyanate, hexamethylene diisocyanate, and isophorone diisocyanate. The ingredients described above may be used each alone or two or more of them may be used in combination.

While the epoxy resin is not particularly restricted, acidic group or basic group-containing epoxy resins can be used preferably. The acidic group or basic group-containing epoxy resin can be produced, for example, by addition or addition polymerization of a polyvalent carboxylic acid such as adipic acid or trimellitic acid anhydride, or an amine such as dibutyl amine or ethylene diamine to the epoxy resin as a base.

In the invention, a self-dispersible resin may also be used as the synthetic resin. The self-dispersible resin is a resin having a hydrophilic group in the molecule and having a dispersibility to liquid such as water. The hydrophilic group includes, for example, —COO— group, —SO$_3$— group, —CO— group, —OH group, —OSO$_3$— group, —PO$_3$H$_2$— group, —PO$_4$— group, and salts thereof. Among them, anionic hydrophilic groups such as —COO— group, and —SO$_3$— group are particularly preferred. The self-dispersible resin having one or more such hydrophilic groups is dispersed in water without using a dispersant or by merely using an extremely small amount of a dispersant. While the amount of the hydrophilic groups containing the self-dispersible resin is not particularly restricted, it is preferably from 0.001 to 0.050 mol and more preferably, from 0.005 to 0.030 mol based on 100 g of the self-dispersible resin. The self-dispersible resin can be produced, for example, by bonding a compound having a hydrophilic group and an unsaturated double bond (hereinafter referred to as "hydrophilic group-containing compound") to the resin. Bonding of the hydrophilic group-containing compound to the resin can be conducted in accordance with the method such as graft polymerization or block polymerization. Further, the sell-dispersible resin can also be produced by polymerizing a hydrophilic group-containing compound or a hydrophilic group-containing compound and a compound copolymerizable therewith.

The resin to which the hydrophilic group-containing compound is bonded includes, for example, styrenic resins such as polystyrene, poly-α-methyl styrene, chloropolystyrene, styrene-chlorostyrene copolymers, styrene-propylene copolymers, styrene-butadiene copolymers, styrene-vinyl chloride copolymers, styrene-vinyl acetate copolymers, styrene-maleic acid copolymers, styrene-acrylate copolymers, styrene-methacrylate copolymers, styrene-acrylate-methacrylate copolymers, styrene-α-methyl chloroacrylate copolymers, styrene-acrylonitrile-acrylate copolymers, and styrene-vinylmethyl ether copolymers; (meth)acrylic resins; polycarbonate; polyesters; polyethylene; polypropylene; vinyl polychloride; epoxy resins; urethane-modified epoxy resins; silicone-modified epoxy resins; rosin-modified maleic acid resins; ionomer resins; polyurethane; silicone resins; ketone resins; ethylene-ethyl acrylate copolymers; xyrene resins; polyvinyl butyral; terpene resins; phenol resins; aliphatic hydrocarbon resins; and cycloaliphatic hydrocarbon resins.

The hydrophilic group-containing compound includes, for example, unsaturated carboxylic acid compounds and unsaturated sulfonic acid compounds. The unsaturated carboxylic acid compounds include, for example, unsaturated carboxylic acids such as (meth)acrylic acid, crotonic acid, and isochrotonic acid; unsaturated dicarboxylic acids such as maleic acid, fumaric acid, tetrahydrophthalic acid, itaconic acid, and citraconic acid; acid anhydrides such as maleic acid anhydride and citraconic acid anhydride; alkyl esters thereof, dialkyl esters thereof, alkali metal salts thereof, alkaline earth metal salts thereof, and ammonium salts thereof. As the unsaturated sulfonic acid compound, for example, styrene sulfonic acids, sulfoalkyl(meth)acrylates, and metal salts and ammonium salts thereof can be used. The hydrophilic group-containing compounds may be used each alone or two or more of them may be used in combination. Further, as the monomer compounds other than the hydrophilic group-containing compound, sulfonic acid compounds can be used, for example. The sulfonic acid compound includes, for example, sulfoisophthalic acid, sulfoterephthalic acid, sulfophthalic acid, sulfosuccinic acid, sulfobenzoic acid, sulfosalicylic acid, and metal salts or ammonium salts thereof.

Specific examples of the additive for use in the synthetic resin used in the invention include, for example, various shapes (granular, fibrous, or flaky shape) of inorganic fillers, colorants, antioxidants, release agents, antistatics, charge controllers, lubricants, heat stabilizers, flame retardants, anti-dripping agents, UV-absorbents, light stabilizers, light screening agents, metal inactivators, antiaging agents, slipping agents, plasticizers, impact strength improvers, and compatibilizing agents.

Additive for the synthetic resin such as a colorant may be used in the form of a master batch for uniformly dispersing the additive for the synthetic resin in the kneaded product. Further, two or more kinds of additives for the synthetic resin may be used as composite particles. The composite particles can be manufactured by adding an appropriate amount of water and a lower alcohol, granulated by a general granulating machine such as a high speed mill and drying the same. The master hatch and the composite particles are mixed with the synthetic resin upon dry mixing.

The molten kneaded product obtained as described above is mixed with the aqueous medium containing the surfactant. The surfactant has a role as a wetting agent for well fitting the surface of the molten kneaded product with the aqueous medium. For the surfactant, a polymeric surfactant is used preferably. By the use of the polymeric surfactant, foaming less occurs compared with a case of low molecular surfactant and occurrence of minute foams under sub-micron size or less which are difficult to be defoamed in the subsequent step can be prevented. While the aqueous medium is not particularly restricted so long as it is a liquid material not possibly dissolving the molten kneaded product containing the synthetic resin by the addition of the surfactant and capable of uniformly dispersing the same, water is preferred considering the easy step control, liquid discharging treatment after the entire step and easy handling. The surfactant is preferably added to the aqueous medium before addition of the molten kneaded product to the aqueous medium.

The molten kneaded product containing the synthetic resin and the aqueous medium containing the surfactant are mixed by using a general mixer to obtain a mixture containing the molten kneaded product and the aqueous medium. While there is no particular restriction on the addition amount of the molten kneaded product to the aqueous medium, it is preferably 3% by weight to 45% by weight and, more preferably, 5% by weight to 30% by weight based on the total amount for the molten kneaded product and the aqueous medium containing the surfactant.

Further, while the molten kneaded product containing synthetic resin and the aqueous medium containing the surfactant may be mixed under heating or under cooling, it is usually conducted at a room temperature. The mixer includes, for example, Henschel type mixing apparatus such as Henschel mixer (trade name of products, manufactured by Mitsui Mining Co.), super mixer (trade name of products, manufactured by Kawata Co.), Mechanomil (trade name of products, manufactured by Okada Seiko Co.), Ang mill (trade name of products, manufactured by Hosokawa Micron Co.), Hybridization System (trade name of products, manufactured by Nara Machinery Co., Ltd.), and Cosmo System (trade name of products, manufactured by Kawasaki Heavy Industry Co.).

As the surfactant, an anionic surfactant is preferred. The anionic surfactant is excellent in the performance of improving the dispersibility of the molten kneaded product and the resin particles in the aqueous medium in the aggregating step S4 to be described later. The anionic surfactant includes, for example, sulfonic acid type anionic dispersants, sulfate type anionic dispersants, polyoxyethylene ether type anionic dispersants, phosphate type anionic dispersants and polyacrylate salts. As the specific examples of the anionic surfactant, for example, sodium dioctyl sulfosuccinate, sodium dodecyl benzene sulfonate, sodium polyacrylate, and polyoxyethylene phenyl ether can be used preferably, for example. The anionic surfactant may be used each alone or two or more of them may be used together. The surfactant may not be restricted to the anionic surfactant but may also be a cationic dispersant used as a coagulant to be described later.

While the addition amount of the surfactant is not particularly restricted, it is preferably 0.1% by weight to 5% by weight based on the total weight of the mixture of the molten kneaded product containing the synthetic resin and the aqueous medium containing the surfactant. In a case where it is less than 0.1% by weight, the dispersing effect of the resin particles with the surfactant is not sufficient in the aggregating step S4 to be described later to possibly cause excess aggregation. Even when it is added in excess of 5% by weight, the dispersing effect is not improved more and, rather, the viscosity of the resin particle liquid dispersion is increased to lower the dispersibility of the resin particles. As a result, excess aggregation may occur possibly.

A dispersion stabilizer, a viscosity improver, etc. may be added to the aqueous medium. However, in another embodiment of the invention to be described later, the dispersion stabilizer may be added after the defoaming step of step Sb to be described later and the viscosity improver may be added before the preliminarily-pulverizing step Sa to be described later. The dispersion stabilizer can stabilize the dispersion of the molten kneaded product in the aqueous medium. The viscosity improver is effective, for example, for further fine granulation of the molten kneaded product.

For the dispersion stabilizer, those customarily used in the relevant field can be used. Among them, water soluble polymeric dispersion stabilizers are preferred. The water soluble polymeric dispersion stabilizers include, for example, (meth)acrylic polymers, polyoxyethylene polymers, cellulose polymers, polyoxyalkylene alkylaryl ether sulfates, and polyoxyalkylene alkyl ether sulfates. (Meth) acrylic polymers contain one or more hydrophilic monomers selected from the following monomers: for example, acrylic monomers such as (meth)acrylic acid, α-cyano acrylic acid, α-cyanomethacrylic acid, itaconic acid, chrotonic acid, fumalic acid, maleic acid, and maleic acid anhydride; hydroxyl group-containing acrylic monomers such as β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, and 3-chloro-2-hydroxypropyl methacrylate; ester monomers such as diethylene glycol monoacrylate, diethylene glycol monomethacrylate, glycerin monoacrylate, and glycerin monomethacrylate; vinyl alcohol monomers such as N-methylol acrylamide, and N-methylol methacrylamide; vinyl alkyl ether monomers such as vinyl methyl ether, vinylethyl ether, and vinyl propyl ether; vinylalkyl ester monomers such as vinyl acetate, vinyl propionate, and vinyl butylate; aromatic vinylic monomers such as styrene, α-methylstyrene, and vinyl toluene; amide monomers such as acrylamide, methacrylamide, diacetone acrylamide, and methylol compounds thereof; nitrile monomers such as acrylonitrile and methacrylonitrile; acid chloride monomers such as acrylic acid chloride, and methacrylic acid chloride; vinyl-nitrogen-containing heterocyclic monomers such as vinyl pyridine, vinyl pyrrolidone, vinyl imidazole, and ethyleneimine; and crosslinkable monomers such as ethylene glycol dimethacrylate, diethylene glycol dimethacrylate, arylmethacrylate, and divinyl benzene.

Polyoxyethylene polymers include, for example, polyoxyethylene, polyoxypropylene, polyoxyethylene alkylamine, polyoxypropylene alkylamine, polyoxyethylene alkylamide, polyoxypropylene alkylamide, polyoxyethylene nonylphenyl ether, polyoxyethylene lauryl phenyl ether, polyoxyethylene stearyl phenyl ester, and polyoxyethylene nonyl phenyl ester.

Cellulose polymers include, for example, methyl cellulose, hydroxylethyl cellulose, and hydroxypropyl cellulose.

Polyoxyalkylene alkylaryl ether sulfates include, for example, sodium polyoxyethylene lauryl phenyl ether sulfate, potassium polyoxyethylene lauryl phenyl ether sulfate, sodium polyoxyethylene nonylphenyl ether sulfate, sodium polyoxyethylene oleylphenyl ether sulfate, sodium polyoxyethylene cetylphenyl ether sulfate, ammonium polyoxyethylene laurylphenyl ether sulfate, ammonium polyoxyethylene nonylphenyl ether sulfate, and ammonium polyoxyethylene oleylphenyl ether sulfate.

Polyoxy alkylene alkyl ether sulfates include, for example, sodium polyoxyethylene lauryl ether sulfate, potassium polyoxyethylene lauryl ether sulfate, sodium polyoxyethylene oleyl ether sulfate, sodium polyoxyethylene cetyl ether sulfate, ammonium polyoxyethylene lauryl ether sulfate, and ammonium polyoxyethylene oleyl ether sulfate.

The dispersion stabilizers may be used each alone or two or more of them may be used in combination. The addition amount of the dispersion stabilizer is not particularly restricted but it is preferably 0.05% by weight to 10% by weight and, more preferably, 0.1% by weight to 3% by weight based on the mixture of the molten kneaded product and the aqueous medium containing the surfactant.

As the viscosity improver, polysaccharide type viscosity improvers selected from synthetic polymeric polysaccharides and natural polymeric polysaccharides are preferred. As the synthetic polymeric polysaccharides, known materials can be used and include, for example, cationified cellulose, hydroxyethyl cellulose, starch, ionized starch derivatives, and block copolymers of starch and a synthesis polymer. The natural polymeric polysaccharides include, for example, hyaluronic acid, carrageenan, locust bean gum, xanthane gum, guar gum, and gellan gum. The viscosity improvers may be used each alone or two or more of them may be used in combination. While the addition amount of the viscosity improver is not particularly restricted, it is, preferably, from 0.01% by weight to 2% by weight based on the entire amount of the mixture of the molten-kneaded product and the aqueous medium containing the surfactant.

The mixture of the molten kneaded product obtained in the mixture preparing step and the aqueous medium containing the surfactant may be served to a preliminarily-pulverizing step and a defoaming step before being served to the coarsely-pulverizing step.

Figure 2:
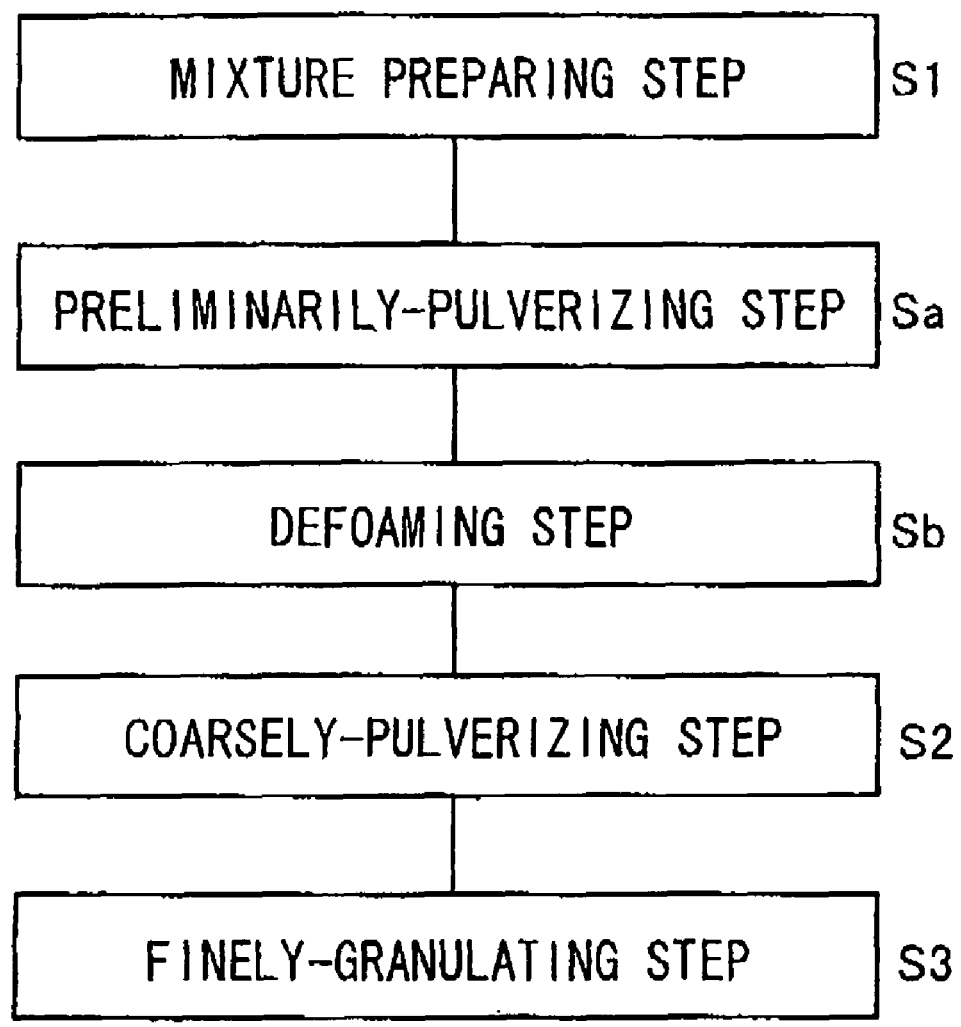
FIG. 2 is a flow chart showing a method of manufacturing resin particles according to another embodiment of the invention.

FIG. 2 is a flow chart showing a method of manufacturing resin particles according to another embodiment of the invention. The method of manufacturing resin particles according to another embodiment of the invention shown in FIG. 2 include a mixture preparing step of step S1, a preliminarily-pulverizing step of step Sa, a defoaming step of step Sb, a coarsely-pulverizing step S2, and a finely-granulating step of step S3. The method of manufacturing resin particles according to another embodiment of the invention shown in FIG. 2 includes, in the step of manufacturing the resin particle shown in FIG. 1, a preliminarily-pulverizing step of step Sa and a defoaming step of step Sb between the mixture preparing step of step S1 and the coarsely-pulverizing step of S2.

[Preliminarily-Pulverizing Step]

In the preliminarily-pulverizing step of step Sa, the molten kneaded product containing the synthetic resin obtained in the mixture preparing step of step S1 is treated by a pulverizing apparatus capable of wet pulverization, pulverized to a sub-micron order such that the particle size of the preliminary pulverizate of the synthetic resin is reduced to 500 μm or less. In view of the structure of a high pressure homogenizer, treated product can not pass through the small diameter nozzle unless the product is pulverized to a certain extent (about sub-micron order). In a case where the treated product has a size of a milli-order, it is necessary to pulverize the same previously to the sub-micron order. However, a liquid containing those generating a great amount of bubbles as the dispersant from the first, generates bubbles at or less than the sub-micron order during pulverization making defoaming difficult. In view of the above, by preliminarily pulverizing the same, for example, by a colloid mill in a state not containing the dispersant, bubbles under submicron size which are difficult to be defoamed can be removed from the first, and the subsequent homogenizing treatment can be proceeded efficiently.

The pulverizing apparatus is not particularly restricted so long as it can conduct wet pulverization and includes, for example, a vibration mill, an automatic mortar, a sand mill, a dyne mill, a cobol mill, attritor, planetary gear ball mill, ball mill, and colloid mill. Among them, the colloid mill is preferred.

Figure 3A:
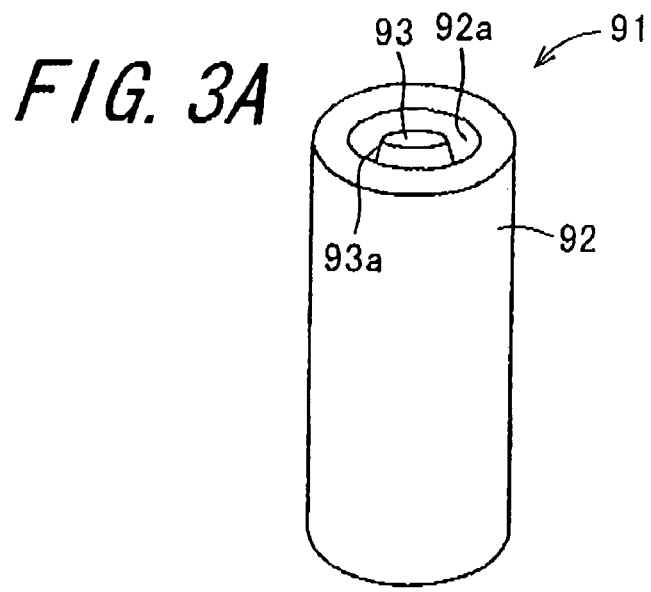
FIGS. 3A and 3B are views schematically each showing the constitution for a main portion of a colloid mill.
Figure 3B:
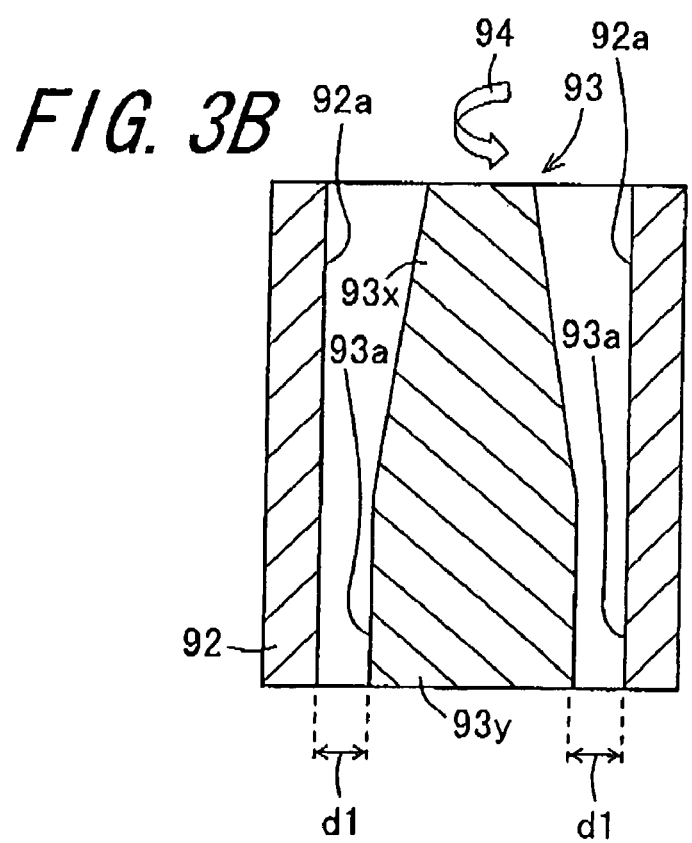

FIGS. 3A and 3B are views schematically showing the constitution for a main portion of a colloid mill 91. FIG. 3A is a perspective view of the colloid mill 91. FIG. 3B is a cross sectional view of the colloid mill 91 cutting along a plane containing a rotational shaft. The colloid mill 91 includes a rotor member 93 disposed so as to rotate about a predetermined rotational axial line and a stator member 92 surrounding the rotor member 93 circumferentially. The stator member 92, a central axis line of which is aligned coaxially with the rotation axis of the rotor member 93, is a member disposed so as to extend in the vertical direction. The stator member 92 is, for example, in a cylindrical shape. Unevenness as a knurl is formed to the inner circumferential surface 92a of the stator member 92. The rotor member 93 is a member which is spaced at the outer circumferential surface 93a thereof with a gap to the inner circumferential surface 92a of the stator member 92 in the inside of the stator member 92, and disposed so as to rotate about the axial line, that is, in the direction of an arrow 94 by a driving mechanism (not shown). The rotor member 93 is, for example, in a cylindrical shape. At the outer circumferential surface 93a of the rotor member 93 is formed with unevenness as a knurl in the same manner as in the inner circumferential surface 92a of the stator member 92. Further, one end 93x of the rotor member 93 in the vertical direction increases in the cross sectional diameter in the direction perpendicular to the vertical direction toward the vertical downward direction and is in contiguous with the other end 93y. In the other end 93y, the cross sectional diameter in the direction perpendicular to the vertical direction is identical for every portion. Since the rotor member 93 has such a shape, the distance between the stator member 92 and the rotor member 93 is narrowed gradually toward the downward vertical direction and is kept constant from the midway. In this case, the distance between the stator member 92 and the other end 93y of the rotor member 93 is defined as a gap d1.

In the colloid mill 91, by passing the molten kneaded product in the mixture downwardly in the vertical direction through the gap d1 between the stator member 92 and the rotor member 93, the molten kneaded product is pulverized to form a preliminary pulverizate of molten kneaded product under the rotation of the rotor member 93. In this case, it is preferred that the gap d1 is controlled, preferably, 50 μm or less and, more preferably, 40 μm to 50 μm. By controlling the gap d1 to the range described above, preliminary pulverizate of molten kneaded product containing the synthetic resin with a fluctuation coefficient of preferably 25 to 45 and, further preferably, 25 to 40. In this case, the volume average particle size of the preliminary pulverizate of molten kneaded product is about 20 to 100 μm and, preferably, about from 20 to 70 μm. Further, in the finely-granulating step of step S3 as the subsequent step, in order to prevent occurrence of clogging, etc. in a pressure proof nozzle and conduct fine granulation smoothly, it is preferred to contain a preliminary pulverizate of molten kneaded product with a particle size of 500 μm or less. As a measure, by repeating pulverization of passing through the gap d1 till the volume average particle size of the preliminary pulverizate of molten kneaded product is decreased to less than 100 μm, an aqueous slurry containing preliminary pulverizate of molten kneaded product in which the content of the preliminary pulverizate of molten kneaded product with the particle size in excess of 500 μm is not so much as resulting in trouble in the next step can be obtained. Further, while the flowing rate of the aqueous slurry containing the preliminary pulverizate of molten kneaded product, it is preferably 30 kg/h to 70 kg/h and, more preferably, 45 kg/h to 55 kg/h. Further, while the passage of the aqueous slurry containing the preliminarily pulverizate of molten kneaded product through the gap is usually conducted at a normal temperature and normal pressure, it may be conducted optionally under pressurization or depressurization and under heating or under cooling. As described above, by controlling the particle size distribution of the preliminary pulverizate of molten kneaded product and pulverizing such that the grain diameter of the preliminarily pulverizate of the molten kneaded product is 500 μm or less, occurrence of clogging in the pressure proof nozzle can be prevented in the finely-granulating step of step S3 as the subsequent step to smoothly conduct fine granulation. As the colloid mill, commercial product can be used and include, for example, PUC colloid mill type 60 (trade name of products manufactured by Nippon Ball Valve Co.), disperse mill D (trade name of products manufactured by Hosokawa Micron). In the commercial products described above, the distance between the stator member and the other end of the rotor member can be controlled, for example, within a range of 40 μm to 200 μm, and in particular, it is preferable to use a PVC Colloid Mill Type 60 (trade name of products manufactured by Nippon Ball Valve).

In the preliminarily-pulverizing step Sa, a viscosity improver may be added to a mixture of the molten kneaded product containing the synthetic resin and the aqueous medium containing the surfactant obtained in the mixture preparing step S1.

Addition of the viscosity improver in the preliminarily-pulverizing step provides an effect of further fine granulation of the molten kneaded product containing the synthetic resin, and the treating efficiency in the coarsely-pulverizing step S2 and the finely-granulating step S3 can be improved. Further, addition of the viscosity improver in the preliminarily-pulverizing step can uniformly disperse a viscosity improver less dispersible in the aqueous medium, for example, xanthan gum uniformly in the mixture of the molten kneaded product containing the synthetic resin and the aqueous medium containing the surfactant. However, in a case of conducting preliminary pulverization for an excessively long time, the molecular chain of xanthan gum may possibly be disconnected to possibly impair the viscosity improving effect, it is important to complete the preliminary pulverization in an optional time, for example, about 10 min. The viscosity improver includes the viscosity improver as described in the mixture preparing step S1 above.

[Defoaming Step]

In the defoaming step of step Sb, a mixture of the molten kneaded product containing the synthetic resin and the aqueous medium containing the surfactant obtained in the preliminarily-pulverizing step of step Sa is defoamed such that the dissolved oxygen amount in the mixture decreases to 7.5 mg/L or less. By removing bubbles and dissolved gases in the aqueous slurry containing the preliminary pulverizate of molten kneaded product, in the defoaming step Sb, external force can be applied more effectively to the preliminary pulverizate of molten kneaded product in the subsequent coarsely-pulverizing step S2 and the finely-granulating step S3. In a case where bubbles and dissolved gases are contained in the aqueous medium, they form sites for the occurrence of cavitation referred to as a cavitation phenomenon, which consumes the energy of the external force for crushing the generated bubbles and external force can not be provided effectively to the preliminarily pulverizates of the synthetic resin. Further, in a case where the bubbles are attached to the surface of the treated material to be pulverized, since it can not be wetted sufficiently with the dispersant, coarse pulverization and fine granulation can not be conducted sufficiently. In a case where the amount of the dissolved oxygen in the aqueous slurry containing the preliminary pulverizate of molten kneaded product is 7.5 mg/L or less, since the bubbles and the dissolved gases are sufficiently released, efficient pulverization and fine granulation can be conducted and the resin particles can be manufactured while greatly shortening the processing time necessary for pulverization and fine granulation. Further, since the amount of the bubbles in the aqueous medium is small, wasteful consumption of the dispersant can be suppressed due to affinity between the dispersant and the bubbles and, accordingly, this also results in the saving of the amount of the dispersant.

As the defoaming apparatus, known apparatus can be used and a continuous defoaming apparatus can be used suitably and they include, for example, PUC EVA (trade name of products manufactured by Nippon Ball Valve Co.), T. K. Highbisdapper type 3 (trade name of products manufactured by Plymix Co.).

Before serving the aqueous slurry containing the preliminary pulverizate of molten kneaded product obtained in the defoaming step of step Sb to the coarsely-pulverizing step of step S2, a dispersion stabilizer may be added to the aqueous slurry. In a case of adding the dispersion stability to the aqueous slurry in a defoamed state in the defoaming step Sb, an adverse effect is not caused on the pulverizing treatment in the subsequent coarsely-pulverizing step S2 and the finely-granulating step S3 by the bubbles deposited on the surface of the preliminary pulverizate in the aqueous slurry containing the preliminary pulverizate of molten kneaded product. While there is no particular restriction on the addition amount of the dispersion stabilizer, it is preferably 0.05% by weight to 10% by weight and, more preferably, 0.1% by weight to 3% by weight based on the total amount for the aqueous medium and the dispersion stabilizer. By adding the dispersion stabilizer within the range described above, coarse pulverization and fine granulation of the molten kneaded product in the coarsely-pulverizing step of step S2 and the finely-granulating step of step S3 proceeds smoothly. The aqueous slurry containing the preliminary pulverizate of molten kneaded product and the dispersant are mixed by using a usual mixer to thereby enabling to obtain an aqueous slurry containing the preliminarily pulverizate of molten kneaded product containing the dispersant. The aqueous slurry containing the preliminary pulverizate of molten kneaded product and the dispersion stabilizers may be mixed under heating, under cooling or at a room temperature.

[Coarsely-Pulverizing Step]

In the coarsely-pulverizing step of step S2, a mixture of a molten kneaded product containing the synthetic resin and an aqueous medium containing the surfactant is pressurized to 15 MPa to 120 MPa to obtain an aqueous slurry containing coarse particle of the molten kneaded product (hereinafter referred to as "coarse pulverizate liquid dispersion"). In this embodiment, the coarsely-pulverizing step is conducted by passing the mixture of the molten kneaded product of the synthetic resin and the aqueous medium containing the surfactant under pressurization at 15 MPa to 120 MPa and at a temperature of 10° C. or higher and lower than the glass transition temperature (Tg) of the synthetic resin through the pressure proof nozzle. For such a coarsely-pulverizing step, a high pressure homogenizer is used for example.

The high pressure homogenizer is an apparatus for pulverizing particles under pressure. As the high pressure homogenizer, commercial products and those described in Patent Document, etc. are known. Commercial products of the high pressure homogenizer include, for example, chamber type high pressure homogenizers such as Microfluidizer (trade name of products, manufactured by Microfluidics Co.), Nanomizer (trade name of products, manufactured by Nanomizer Co.), Altimizer (trade name of products, manufactured by Sugino Machine Ltd.), high-pressure homogenizer (trade name of products, manufactured by Rannie Co.), high-pressure homogenizer (trade name of products, manufactured by Sanmaru Machinery Kogyo Co.), and high pressure homogenizer (trade name of products, manufactured by Izumi Food Machinery Co.). Further, the high pressure homogenizers described in the Patent Document include, for example, those described in International Publication WO03/059497. Among them, the high pressure homogenizer described in WO03/059497 is preferred.

Figure 4:
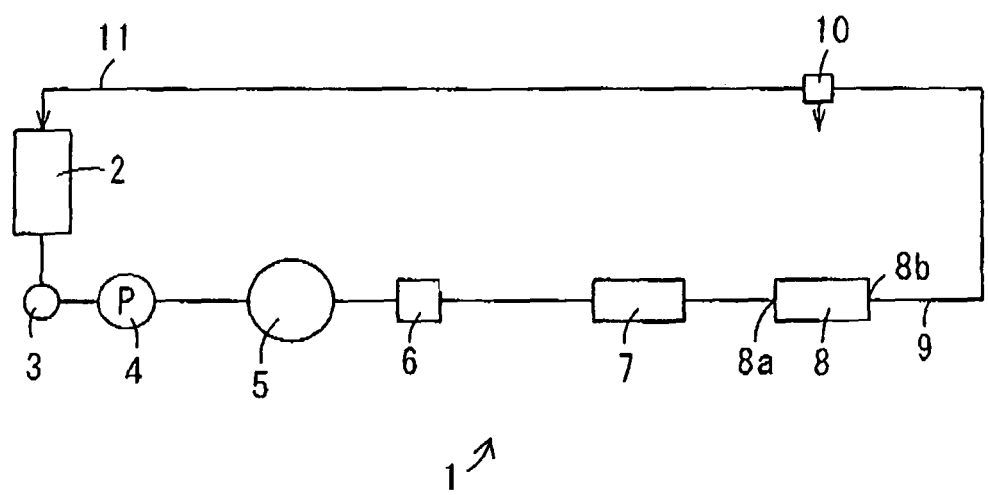
FIG. 4 is a system chart schematically showing the constitution of a pulverizing high pressure homogenizer.

FIG. 4 is a schematic systematic view showing the constitution of a high-pressure homogenizer 1 for pulverization. In this embodiment, the high pressure homogenizer 1 for pulverization is used not only in the coarsely-pulverizing step of step S2 but also in the finely-granulating step of step S3.

The high pressure homogenizer 1 for pulverization includes a tank 2, a delivery pump 3, a pressurizing unit 4, a heater 5, a pulverizing nozzle 6, a depressurizing module 7, a cooler 8, a pipeline 9 and a take-out port 10. In the high pressure homogenizer 1 for pulverization, the tank 2, the delivery pump 3, the pressurizing unit 4, the heater 5, the pulverizing nozzle 6, the depressurizing module 7, and the cooler 8 are connected in this order by way of a pipeline 9. In the system connected by pipeline 9, the coarsely pulverized liquid dispersion after cooling optionally by the cooler 8 may be taken out of the system from the take-out port 10, or the coarsely pulverized liquid dispersion after cooling by the cooler 8 may be returned to the tank 2 again and circulated repetitively in the direction of an arrow 11.

The tank 2 is a vessel-type member having an internal space and stores a mixture of a molten kneaded product containing synthetic resin and an aqueous medium containing a surfactant (coarsely pulverized liquid dispersion in the finely-granulating step). The delivery pump 3 delivers the mixture stored in the tank 2 to the pressurizing unit 4. The pressurizing unit 4 pressurizes the mixture supplied from the delivery pump 3 and delivers the same to the heater 5. For the pressurizing unit 4, a plunger pump including a plunger and a pump driven for suction and discharge by the plunger can be used. The heater 5 may or may not be used in the coarsely pulverizing step S2 and heats the mixture supplied from the pressurizing unit 4 and in a pressurized state in the finely-granulating step S3. For the heater 5, those including coiled (hereinafter also referred to as "spiral") pipeline and a heating section can be used for instance. The coiled pipeline includes, for example, a coiled pipeline 50 for example as shown in FIG. 5.

Figure 5:
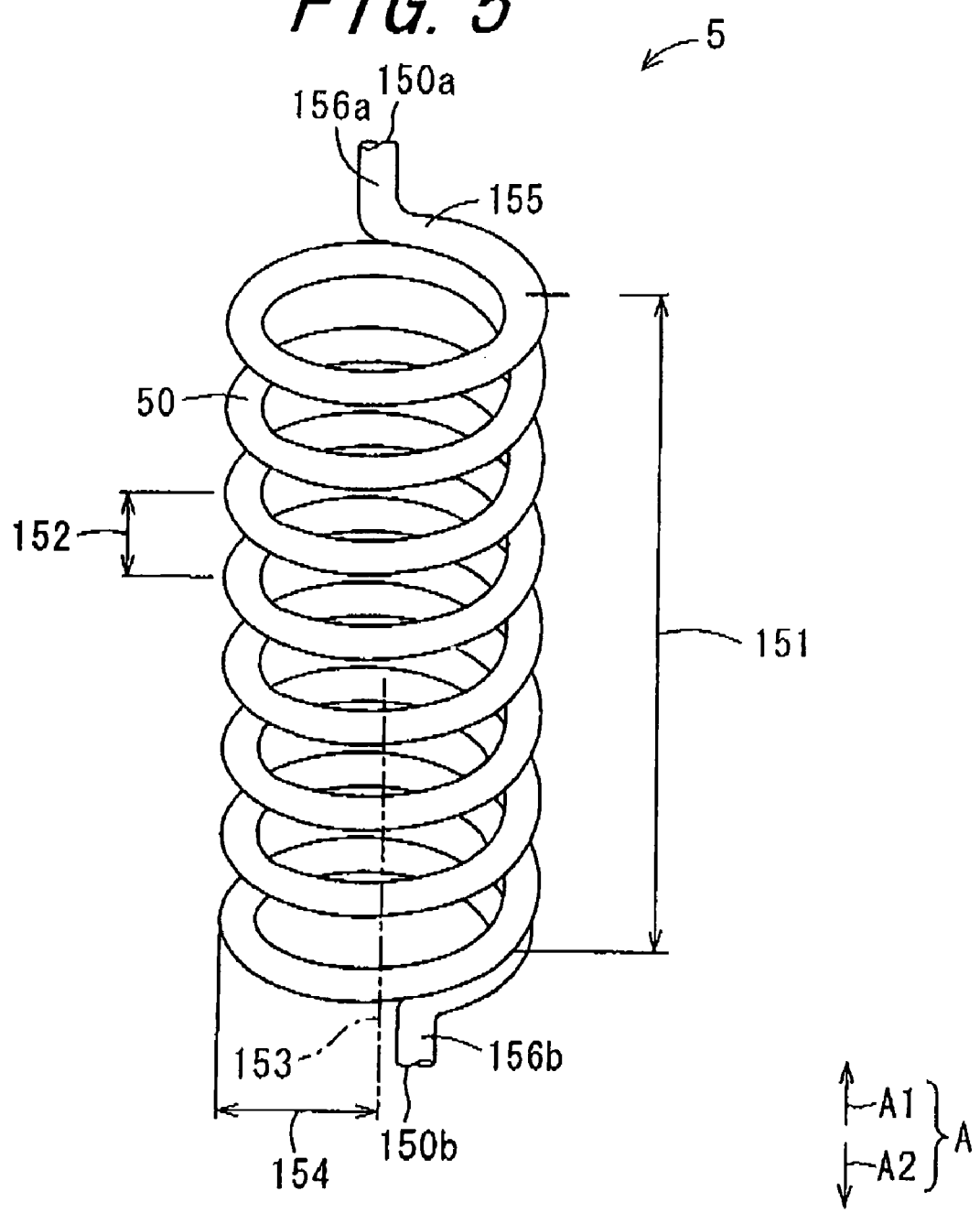
FIG. 5 is a perspective view showing the constitution of a heater.

FIG. 5 is a perspective view showing the constitution of the heater 5. A coiled pipeline 50 is in a cylindrical shape and formed by winding a single cylindrical pipe-like member in a single-layered coiled shape. More specifically, the coiled pipeline 50 includes a wound portion where the pipe-like member is wound in a circumferential direction 155 and two connection portions 156a, 156b extending from the wound portion 155 to both sides A1, A2 in the axial direction A. In the two connection portions 156a, 156b, an inlet 150a is formed to a flow channel for the first connection portion 156a extending in one axial direction A1, while an exit 150b is formed in the flow channel of the second connection portion 156b extending in the other axial direction A2. The inlet 150a and exit 150b in the channel of the coiled pipeline 50 are connected respectively to the pipeline 9. The size of the coiled pipeline 50 in the axial direction A is referred to as "free height 151" and the size for one-half of the outer diametrical size of the coiled pipeline 50 is referred to as "coiled radius (hereinafter also referred to as "coil radius of curvature" 154)", and a distance that the pipe-shaped member advances by one rotation, that is, a gap between the two adjacent portions of the pipe-shaped member is referred to as "coil pitch 152".

The heating section is disposed along the outer circumferential surface of the coil-like pipeline and includes a pipeline capable of passing a heat medium, for example, steam therethrough and a heating medium supply section for supplying the heat medium to the pipeline. The heating medium supply section is, for example, a boiler.

Figure 6A:
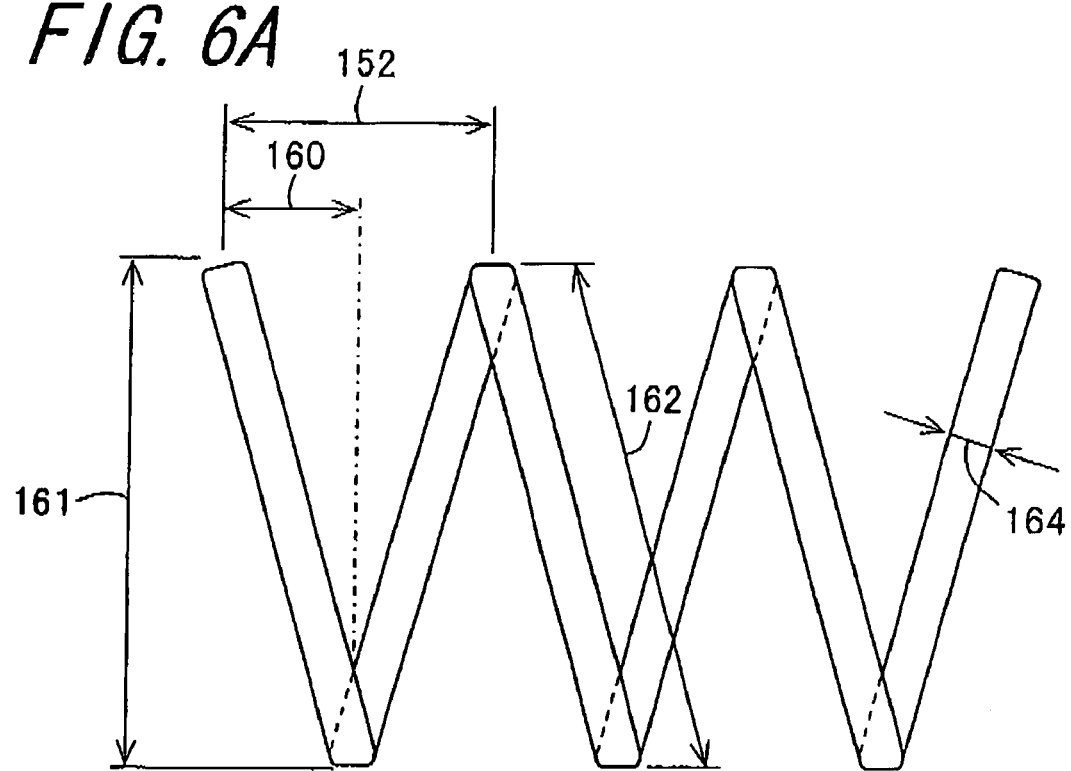
FIG. 6A is a planar projection view in which a coiled pipeline of the heater shown in FIG. 5 is projected on a virtual plane parallel with an axial line.
Figure 6B:
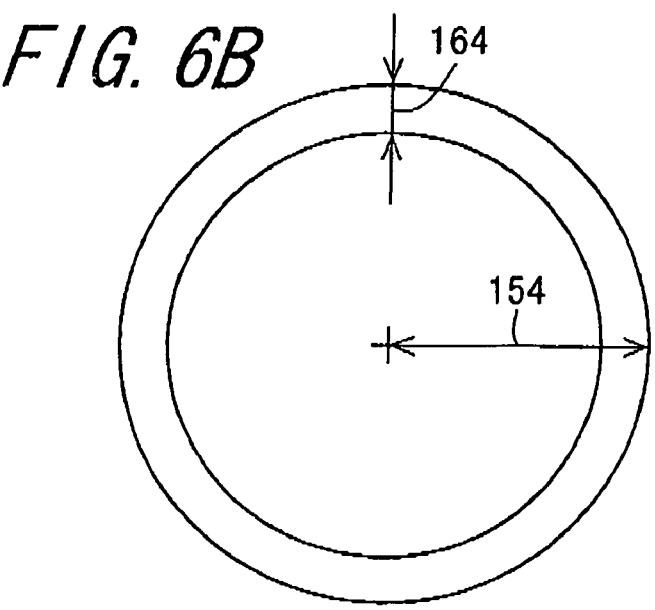
FIG. 6B is a planar projection view in which the coiled pipeline of the heater shown in FIG. 5 is projected on a virtual plane perpendicular to an axial line.

FIG. 6A is a planar projection view in which a coil-like pipeline 50 of the heater 5 shown in FIG. 5 is projected on a virtual plane parallel with the axial line 153. FIG. 6B is a planar projection view in which the coil-like pipeline 50 of the heater 5 shown in FIG. 5 is projected on a virtual plane perpendicular to the axial line 153. In FIG. 6A, the one-half length of the coil pitch 152 is referred to as "one-half coil pitch 160", the length for the outer diametrical size of the coil-like pipeline is referred to a "as perpendicular height 116", and a length necessary for one-half rotation of the pipe-shaped member is referred to as "actual coil height 162". In FIG. 6B, the inner diameter of the pipe-shaped member is referred to as "coil inner diameter 164".

The pulverizing nozzle 6 causes the mixture supplied from the pipeline of the heater 5 to pass through the channel formed in the inside thereof to pulverize the molten kneaded product to coarse particles with the volume average particle size, for example, of 5 μm to 300 μm. For the pulverizing nozzle 6, while a general pressure proof nozzle capable of causing the liquid to pass therethrough can be used, a multiple nozzle having a plurality of flow channels can be used preferably. The flow channels of the multiple nozzle may be formed concentrically with the axial center of the multiple nozzle as the center, or the plurality of flow channels may be formed substantially in parallel in the longitudinal direction of the multiple nozzle. Specific examples of the multiple nozzle include those having one or plurality, preferably, about 1 to 2 flow channels each having an inlet diameter and an exit diameter of about 0.05 to 0.35 mm and a length of 0.5 to 5 cm are formed. Further, a pressure proof nozzle in which the flow channel is not formed linearly in the inside of the nozzle can also be used. The pressure proof nozzle includes, for example, that shown in FIG. 7.

Figure 7:
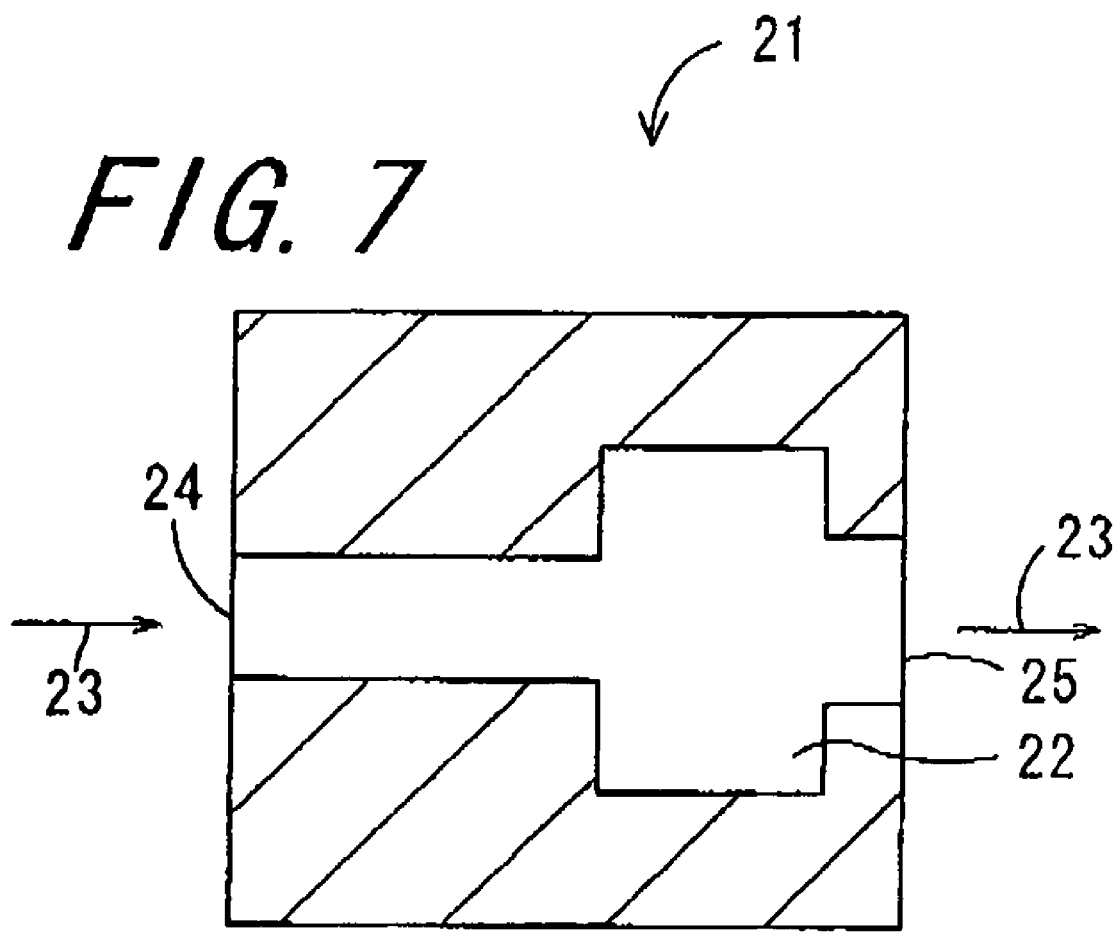
FIG. 7 is a cross sectional view schematically showing the constitution of a pressure proof nozzle.

FIG. 7 is a cross sectional view schematically showing the constitution of a pressure proof nozzle 21. The pressure proof nozzle 21 has a flow channel 22 in the inside. In this embodiment, a cross section of the flow channel 22 in the direction perpendicular to the direction of an arrow 23 showing the passing direction of the mixture is smaller on the side of the inlet 24 and the side of the exit 25, and larger in an intermediate portion between the inlet 24 and the exit 25. The flow channel 22 is formed such that the diameter of the inlet 24 is equal to the diameter of the exit 25. The length of the flow channel 22 in the portion of the small flow channel cross section with respect to the arrow 23 is longer on the side of the inlet 24 than on the side of the exit 25. Further, centers for the cross sections perpendicular to the arrow 23 showing the flowing direction of the mixture of the flow channel 22 are present on one identical axial line parallel with the flowing direction of the mixture.

Figure 8:
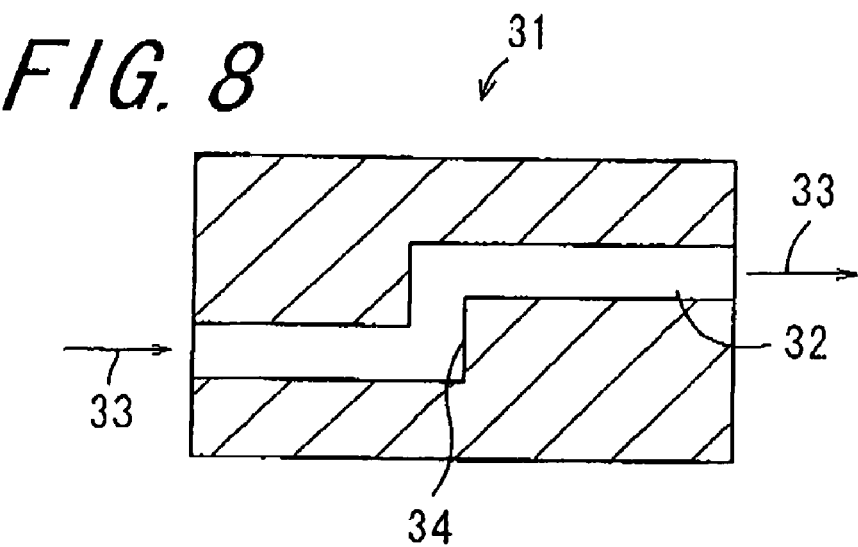
FIG. 8 is a cross sectional view schematically showing the constitution of a pressure proof nozzle according to another embodiment.

FIG. 8 is a cross sectional view schematically showing the constitution of a pressure proof nozzle 31 according to another embodiment. The pressure nozzle 31 has a flow channel 32 in the inside. The flow channel 32 bend in a hook-shaped and has at least one collision wall 34 against which a mixture intrudes into the flow channel 32 in the direction of the arrow 33 abuts. The mixture collides against the collision wall 34 substantially at a right angle, by which the molten kneaded product containing the synthetic resin is coarsely pulverized into a coarse particle of the molten kneaded product diametrically reduced, for example, to a volume average particle size of 5 μm to 300 μm and discharged from the exit of the pressure proof nozzle 31. In the pressure proof nozzle 31, while the inlet diameter and the exit diameter are formed as an identical size, they are not restrictive but the exit diameter may be formed smaller than the inlet diameter. While the exit and the inlet are usually formed into a regular or normal circular shape, they are not restricted thereto but may also be formed, for example, into a normal polygonal shape. The pressure proof nozzle may be disposed by one or more. The molten kneaded product is coarsely pulverized by passing through the pressure proof nozzle 21 or the pressure proof nozzle 31 as described above, to obtain coarsely pulverized liquid dispersion containing coarse particles of the molten kneaded product.

For the depressurizing module 7, a multi-stage depressurizing device as described in WO03/059497 is used preferably. The multi-stage depressurizing device includes an inlet channel, an exit channel, and a multi-stage depressurizing channel. The inlet channel is connected at one end with the pipeline 9 and at the other end with a multi-stage depressurizing channel and introduces a coarsely pulverized liquid dispersion containing the molten kneaded product and in a pressurized state into the multi-stage depressurizing channel. The multi-stage depressurizing channel is connected at one end with the inlet channel and the other end with the exit channel, and depressurizes the coarsely pulverized liquid dispersion in the heated and pressurized state introduced to the inside thereof by way of the inlet channel such that generation of bubbles by bumping (bubbling) does not occur. The multi-stage depressurizing channel includes, for example, a plurality of depressurizing members and a plurality of connection members. For the depressurizing member, a pipe-shaped member is used for instance. As the connection member, a ring-like seal member is used for instance. The multi-stage depressurizing channel is constituted by connecting a plurality of pipe-shaped members of different inner diameters with the ring-shaped seal members. For instance, they include a multi-stage depressurizing channel formed by connecting 2 to 4 pipe-shaped members A each having an identical inner diameter by ring-like seal members from the inlet channel to the exit channel, connecting a next pipe-shaped member B having an inner diameter about twice as large as the pipe-shaped member A by the number of one by a ring-shape seal member and, further, connecting about 1 to 3 pipe-shaped members C each having an inner diameter smaller by about 5 to 20% than that of the pipe-shaped member B by a ring-like seal members. When a coarsely pulverized liquid dispersion in a heated state is passed through such a multi-stage depressurizing channel, the coarse particle liquid dispersion can be depressurized to an atmospheric pressure or a pressurized state approximate thereto without causing bubbling. A heat exchange section for circulating a cooling medium or heating medium may be disposed to the periphery of the multi-stage pressurizing channel and may be cooled or heated at the same time with depressurization in accordance with the value of pressure added to the coarsely pulverized liquid dispersion. The exit channel is connected at one end to the multi-stage depressurizing channel and at the other end to the pipeline 9. The coarsely pulverized liquid dispersion to be depressurized by the multi-stage depressurizing channel is delivered to the pipeline 9. The multi-stage depressurizing device may be constituted such that the inlet diameter is identical with the exit diameter, or it may be constituted such that the exit diameter is larger than the inlet diameter.

In this embodiment, the depressurization module 7 is not restricted to the multi-stage depressurizing device having the constitution as described above, but a depressurizing nozzle can also be used for instance.

Figure 9:
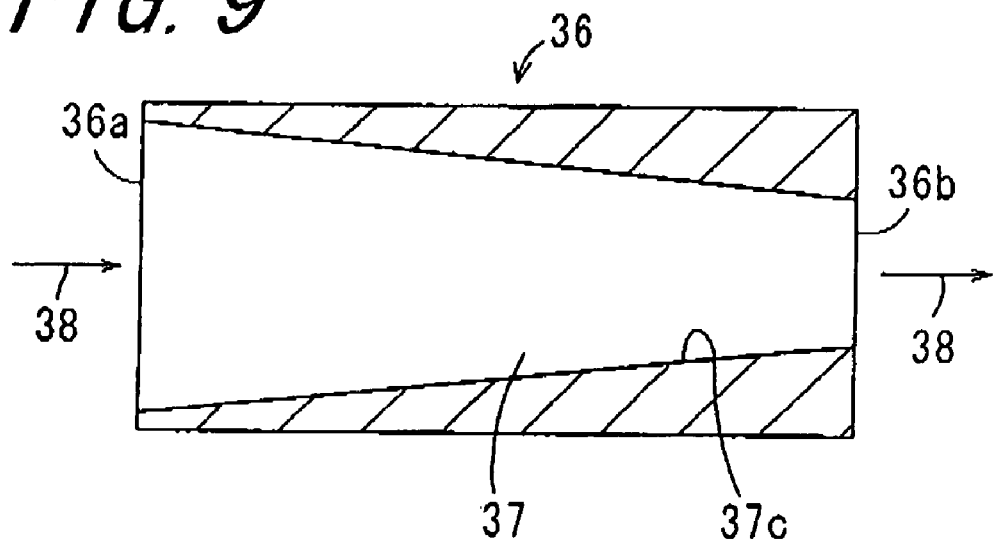
FIG. 9 is a longitudinal cross sectional view schematically showing the constitution of a depressurizing nozzle.

FIG. 9 is a cross sectional view in the longitudinal direction schematically showing the constitution of a depressurizing nozzle 36. In the depressurizing nozzle 36, a flow channel 37 passing through the inside in the longitudinal direction is formed. The inlet 36a and the exit 36b of the flow channel 37 are respectively connected to the pipelines 9. The flow channel 37 is formed such that the diameter for the inlet 36a is larger than the diameter for the exit 36b. Further, in the flow channel 37 of this embodiment, the cross section in the direction perpendicular to the direction of an arrow 38 which is a passing direction of the coarsely pulverized liquid dispersion is gradually decreased from the inlet 36a as it approaches the exit 36b, and the center of the cross section (axis) is present on one identical axis (axis for the depressurizing nozzle 36) parallel with the direction of the arrow 38. According to the pressurizing nozzle 36, the coarsely pulverized liquid dispersion in the pressurized and heated state is introduced from the inlet 36a into the flow channel 37, undergoes depressurization and is then discharged from the exit 36b to the pipeline 9. Aggregates of the coarse particles of the molten kneaded product contained in the coarsely pulverized liquid dispersion aggregated being heated by the heater 5 are in contact with an inner wall surface 37c of the flow channel 37, and excess coarse particles of the molten kneaded product are dissociated from the aggregates and discharged from the exit 36b. Since the inlet diameter is larger than the exit diameter of the flow channel 37 in the depressurizing nozzle 36, more intense shearing force is applied compared with the depressurizing nozzle where the inlet diameter is smaller than the exit diameter as the depressurizing nozzle 51 in the aggregating step S4 to be described later. The multi-stage depressurizing device or the depressurizing nozzle as described above may be provided by one or in plurality. In a case of disposing them in plurality, they may be disposed in series or parallel.

For the cooler 8, a usual fluid cooler having a pressure proof structure can be used. For example, a cooler in which the coarsely pulverized liquid dispersion is cooled by providing a pipeline for circulating cooling water around the pipeline through which the coarsely pulverized liquid dispersion passes and circulating cooling water can be used. In a case where the temperature of the coarsely pulverized liquid dispersion is lower than the glass transition temperature (Tg) of the synthetic resin, the coarsely pulverized liquid dispersion may not always be cooled. Among all, a cooler of a large cooling area such as a bellows type cooler is preferred. Further, it is preferred to constitute such that the cooling gradient is decreased from the cooler inlet to the cooler exit (or so as to lower the cooling performance gradually). When the coarsely pulverized liquid dispersion is cooled abruptly, coarse particles of the molten kneaded product heated from the heater 5 and pulverized coarsely may possibly cause aggregation. Accordingly, for cooling the coarsely particle liquid dispersion moderately and uniformly with no generation of aggregation of the coarsely pulverized coarse particles, it is necessary to decrease the cooling gradient from the inlet to the exit. Since this can further prevent re-aggregation of the coarse particles of coarsely pulverized molten kneaded product and resin particles obtained in the finely-granulating step to be described later, decrease in the diameter of the resin particles can be attained more efficiently and the yield of the resin particles is also improved. The cooler 8 may be disposed by one or in plurality. In a case of disposing the cooler in plurality, they may be disposed in series or parallel. In a case of the serial arrangement, the cooler is disposed preferably such that the cooling performance is gradually lowered in the passing direction of the coarsely pulverized liquid dispersion. The coarsely pulverized liquid dispersion discharged from the depressurizing module 7, containing the resin particles and in the heated state is introduced, for example, from the inlet 8a connected to the pipeline 9 of the cooler 8 into the cooler 8, undergoes cooling at the inside of the cooler 8 having the cooling gradient, and is discharged from the exit 8b of the cooler 8 to the pipeline 9.

The high pressure homogenizer 1 for pulverizating is commercially available. Specific examples can include, for example, NANO3000 (trade name of products; manufactured by Beryu Co., Ltd.). According to the high pressure homogenizer 1, an aqueous slurry containing the mixture or the preliminary pulverizate of the molten kneaded product stored in the tank 2 is introduced in the heated and pressurized state into the pulverizing nozzle 6 and the coarse particles of the molten kneaded product are pulverized and discharged from the pulverizing nozzle 6, the mixture in the pressurized state is introduced into the depressurizing module 7 and depressurized so as not to cause bubbling, and the mixture discharged from the depressurizing module 7 is introduced into the cooler 8 and cooled therein to obtain a coarsely pulverized liquid dispersion of resin particles. The coarsely pulverized liquid dispersion is discharged from the take-out port 10, or circulated again to the tank 2 and applied with the same pulverizing treatment.

In the coarsely-pulverizing step, a mixture of the molten kneaded product containing the synthetic resin and the aqueous solution containing the surfactant is pressurized by the pressurizing unit 4 to 50 MPa to 120 MPa. When the mixture is passed under such a range of the pressure through the pulverizing nozzle 6, large colliding force can be applied to the bubbles deposited on the surface of the molten kneaded product containing the synthetic resin. Bubbles attached to the surface of the molten kneaded product containing the synthetic resin can be removed efficiently. In a case where the pressure is less than 50 MPa, the collision force applied to the bubbles attached to the surface of the molten kneaded product is small and the bubbles can not be removed from the surface of the molten kneaded product. Further, in a case where the pressure exceeds 120 MPa, the nozzle size and the flow rate of the molten kneaded product can not be matched and treatment is not possible. Further, the coarsely pulverized liquid dispersion is controlled to a temperature of 10° C. or higher and lower than the glass transition temperature (Tg) of the synthetic resin. Within the range of the temperature for the coarsely pulverized liquid dispersion, the bubbles can be removed more reliably. In a case where the temperature of the coarsely pulverized liquid dispersion exceeds the glass transition temperature (Tg) of the synthetic resin, the molten kneaded product is aggregated and can not be treated.

In the present invention, the glass transition temperature (Tg) containing the synthetic resin was determined as described below. By using a differential scanning calorimeter (trade name of products: DSC 220, manufactured by Seiko Instruments Inc.), 1 g of the specimen, for example, coarse particles of the molten kneaded product was heated at a temperature elevation rate of 10° C. per minute according to (JIS) K 7121-1987 to measure a DSC curve. A temperature at an intersection between a line extended from a base line on the high temperature side of an endothermic peak corresponding the glass transition of the obtained DSC curve to the low temperature side and a tangential line drawn at a point to maximize the gradient to the curve from the rising part to the top of the peak was defined as the glass transition temperature (Tg).

By the coarsely-pulverizing step, the mixture can be passed through the pressure proof nozzle to obtain coarse particles formed by coarsely-pulverizing the molten kneaded product and the particle size of the coarse particles of the molten kneaded product can be reduced to about 300 μm and, more preferably, 5 μm to 300 μm. Since the molten kneaded product is pulverized to the size described above, the next finely-granulating step can be conducted more efficiently. At the same time, bubbles attached to the molten kneaded product can be removed by the coarsely-pulverizing step to sufficiently ensure the action site of the surfactant at the surface of the coarse particles of the molten kneaded product, and resin particles controlled for the particle size can be manufactured stably and efficiently. After the completion of the coarsely-pulverizing step, the procedure proceeds to the finely-granulating step.

[Finely-Granulating Step]

In the finely-granulating step of step S3, the coarse pulverizate liquid dispersion as an aqueous sully containing the coarse particles of the molten kneaded product obtained in the coarsely-pulverizing step is treated by the high pressure homogenizer method to finely granulate the coarse particles of the molten kneaded product. The high pressure homogenizer method is a method of finely granulating the molten kneaded product by using the high pressure homogenizer described above. The finely-granulating step by the high pressure homogenizer method includes a pulverizing stage, a depressurizing stage and a cooling stage. In the pulverizing stage, the coarse pulverizate liquid dispersion containing the coarse particles of the molten kneaded product is passed through the pressure proof nozzle at 120 MPa to 250 MPa and at or higher than the glass transition temperature (Tg) of the synthetic resin and 200° C. or lower, and the coarse particles of the molten kneaded product are pulverized to obtain an aqueous slurry containing resin particles (hereinafter referred to "resin particle liquid dispersion"). In the depressurizing stage, the resin particle liquid dispersion is gradually depressurized to a pressure not generating bubbling. In the cooling stage, the resin particle slurry is cooled.

In the pulverizing stage, the coarse pulverizate liquid dispersion which is pre-treated by the pulverizing step and in which bubbles are removed from the surface of the coarse particles is pulverized under heating and depressurization to obtain a resin particle liquid dispersion. For heating and depressurization of the coarse pulverizate liquid dispersion, the pressurizing unit 4 and the heater 5 in the pulverizing high pressure homogenizer 1 are used. For the pulverization of the coarse particles, the pulverizing nozzle 6 in the high pressure homogenizer 1 is used. While the pressurizing and heating conditions for the coarse pulverizate liquid dispersion are not particularly restricted, it is pressurized to 120 MPa to 250 MPa and heated to a glass transition temperature (Tg) or higher of the synthetic resin and 200° C. or lower. Further, it is more preferably pressurized to 120 MPa to 250 MPa and heated to Tm (Tm: ½ softening temperature) of the synthetic resin contained in the coarse particles of the molten kneaded product and particularly preferably pressurized to 120 MPa to 250 MPa and heated to Tm to Tm+25° C. of the synthetic resin contained in the coarse particles of the molten kneaded product. In a case where coarse particles contain two or more kinds of synthetic resins, the ½ softening temperature Tm is a value for the synthetic resin having the highest ½ softening temperature.

At a pressure of lower than 120 Mpa, the shearing energy decreases and pulverization may not possibly proceed sufficiently. In a case where the pressure exceeds 250 MPa, it is not practical since the risk increases excessively in the actual production line.

In the present specification, the softening point of the resin particles was measured by using a flowing characteristic evaluation apparatus (trade name of products: Flow Tester CFT-100C, manufactured by Shimadzu Corp.). In the flowing characteristic evaluation apparatus (Flow Tester CFT-100C), it was set such that 1 g of the specimen (coarse particle of molten kneaded product) was extruded from a die (nozzle: 1 mm diameter, 1 mm length) by applying a load of 10 kgf/cm$^2$ (9.8×10$^5$ Pa), heating was conducted at a temperature elevation rate of 6° C. per min, and the temperature at which a one-half amount of the specimen was discharged from the die was determined and defined as a softening point.

When the coarse pulverizate liquid dispersion in the heated and pressurized state is passed through the coiled pipeline 50 in the heater 5, centrifugal force and shearing force are applied in the heated and pressurized state. Simultaneous exertion of the centrifugal force and the shearing force generates turbulence in the flow channel. In a case where the coarse particles of the molten kneaded product is such sufficiently small particles as having a volume average particle size of from 0.03 to 1 µm, the particles pass irregularly undergoing the effect of the turbulent in which the frequency of collision between particles to each other increases remarkably to cause aggregation. On the other hand, in a case of coarse particles where the particle size of the particle is about more than 1 µm and less than 300 µm, since the particles are sufficiently large and the particles flow in a stable state near the inner wall surface of the flow channel by the centrifugal force, they less undergo the effect of the turbulence, less cause aggregation. Accordingly, the particle size of the coarse particles of the molten kneaded mixture contained the coarse pulverizate liquid dispersion can be made uniform.

In the depressurizing stage, the resin particle slurry in the heated and pressurized state obtained by the pulverizing stage is depressurized to an atmospheric pressure or a pressure approximate thereto while keeping it in a state not generating bubbling. For depressurization, the depressurizing module 7 in the pulverizing high pressure homogenizer 1 is used. The resin particle liquid dispersion after the completion of the depressurizing stage contains, for example, resin particles and the liquid temperature is preferably at or higher than the glass transition temperature (Tg) of the synthetic resin and 200° C. or lower and, more preferably, 60° C. or higher and Tm+60° C. or lower (Tm has the same meanings as described above).

In the cooling stage, the resin particle liquid dispersion depressurized in the depressurizing stage and at a liquid temperature of about 60 to Tm+60° C. (Tm has the same meaning as described above) is cooled to form a resin particle liquid dispersion about at 20 to 40° C. For the cooling, a cooler 8 of the pulverizing high pressure homogenizer 1 is used.

By way of the steps described above, resin particles are prepared in the resin particle liquid dispersion. In the resin particles, bubbles attached to the surface of the molten kneaded product-containing the synthetic resin are removed during the coarsely-pulverizing step. This can sufficiently ensure the action site of the surfactant at the surface of the molten kneaded product in the finely-granulating step and resin particles controlled for the particle size can be manufactured stably and efficiently.

The resin particle liquid dispersion containing the obtained resin particles may be aggregated as it is, that is, in a state where the surfactant is present on the surface of the resin particle in the next aggregating step, or resin particles may be isolated from the resin particle liquid dispersion and the resin particles may be again slurrified and aggregated. In a case of using the surfactant and the dispersion stabilizer for the manufacture of the resin particles and aggregating the aqueous slurry containing the resin particles as it is in the next aggregating step, the surfactant and the dispersion stabilizer are in a state present on the surface of the resin particle. For isolating the resin particles from the resin particle liquid dispersion, usual separation means such as filtration or centrifugal filtration is used. In this manufacturing method, the particle size of the obtained resin particles can be controlled by properly controlling the temperature and/or pressure applied to the coarse pulverizate liquid dispersion, the concentration of the coarse particles in the coarse pulverizate resin dispersions, and the cycles of pulverization upon passage through the pulverizing nozzle 6. In the invention, for aggregating the resin particles and obtaining aggregated particles of an appropriate volume average particle size, each of the conditions is controlled such that the volume average particle size of the resin particles is, preferably, 2 µm or less and, more preferably, 0.03 µm to 1 µm.

Then, a method of manufacturing aggregated particles formed by aggregating the resin particles obtained by the method of manufacturing the resin particles according to the inventions to be described.

Figure 10:
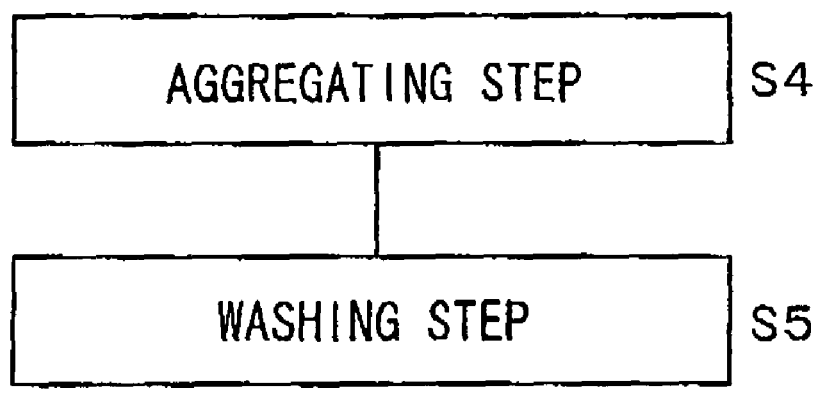
FIG. 10 is a flowchart showing a method of manufacturing resin particles.

FIG. 10 is a flow chart showing the method of manufacturing aggregated particles. The method of manufacturing the aggregated particles shown in FIG. 10 includes an aggregating step of step S4 and a washing step of step S5.

[Aggregating Step]

In the aggregating step of step S4, the obtained resin particles are aggregated in the resin particle liquid dispersion and fused by heating to prepare aggregated particles. In this embodiment, resin particles are aggregated by passing the resin particle liquid dispersion in the heated and pressurized state through the coiled pipeline to obtain an aqueous slurry of aggregated particles (hereinafter referred to as "aggregated particle liquid dispersion").

A coagulant can be added to the resin particle liquid dispersion. By the addition of the coagulant, the dispersibility of the resin particles in the resin particle liquid dispersion is lowered. By passage of the resin particle slurry in this state through the coiled pipeline, the resin particles aggregate freely and smoothly and aggregated particles with less variation in the shape and the particle size can be obtained. As the coagulant, a cationic dispersant or the like can be used. In the case of using the cationic dispersant as the coagulant, an anionic surfactant is also added preferably. The anionic surfactant is added, for example, in the mixture preparing step S1 described above. In a case of adding the anionic surfactant in the mixture preparing step S1 and adding the cationic dispersant in the aggregating step S4, the coarse particles of the molten kneaded product are dispersed and stabilized by the anionic surfactant in the aqueous medium in the mixture preparing step S1, and the resin particles are aggregated by making the anionic surfactant instable with the cationic dispersant having electric charges opposite to that of the anionic surfactant in the aggregating step S4.

As described above, by adding the anionic surfactant to the resin particle liquid dispersion and further adding the cationic dispersant, aggregation of the resin particles proceeds smoothly and occurrence of excess aggregation can be prevented to manufacture aggregated particles with narrow particle size distribution width at a good yield. The ratio of using the cationic dispersant and the anionic dispersant is not particularly restricted so long as they are used at such a ratio that the dispersing effect of the anionic surfactant is lowered by the use of the cationic dispersant. However, considering easy particle size control, easy occurrence of aggregation, prevention for the occurrence of excess aggregation of aggregated particles, further narrowing of the particle size distribution width of the aggregated particles, etc., the anionic surfactant and the cationic surfactant are used preferably at a ratio of 10:1 to 1:10, more preferably, 10:1 to 1:3 and, particularly preferably, 5:1 to 1:2 by weight ratio.

Preferred cationic dispersant includes, for example, alkyltrimethyl ammonium type cationic dispersants, alkylamindeamine type cationic dispersants, alkyldimethylbenzyl ammonium type cationic dispersants, cationic polysaccharide type cationic dispersants, alkyl betain type cationic dispersants, alkylamide betain type cationic dispersants, sulfobetain type cationic dispersants, amineoxide type cationic dispersants, and metal salts. The metal salts include for example, chlorides, and sulfates of sodium, potassium, calcium, magnesium, or the like.

Among them, alkyltrimethyl ammonium type cationic dispersants are more preferred. Specific examples of the alkyltrimethyl ammonium type cationic dispersants include, for example, stearyl trimethyl ammonium chloride, tri(polyoxyethylene)stearyl ammonium chloride, and lauryltrimethyl ammonium chloride. The cationic dispersant may be used each alone or two or more of them may be used together with. The cationic dispersant is used being added to the resin particle liquid dispersion. While the addition amount of the cationic dispersant is not particularly restricted and can be selected property from a wide range, it is preferably from 0.1 to 5% by weight based on the entire amount of the resin particle liquid dispersion. In a case where the addition amount is less than 0.1% by weight, the ability of weakening the disperbility of the resin particles is insufficient to possibly make the aggregation of the resin particles insufficient. In a case where the addition amount exceeds 5% by weight, the dispersing effect of the cationic dispersant develops to possibly make the aggregation insufficient.

The resin particle liquid dispersion is heated, preferably, to a glass transition temperature (Tg) or higher of the resin particle and the softening temperature (° C.) or lower of the resin particle and, more preferably, 60° C. to 90° C. and, pressurized preferably to 5 MPa to 100 MPa and, more preferably, 5 MPa to 20 MPa. In a case where the heating temperature is lower than the glass transition temperature (Tg) of the resin particle, resin particles less aggregate to possibly lower the yield of the aggregated particles. In a case where the heating temperature exceeds the softening temperature of the resin particle, excess aggregation occurs also making it difficult to control the particle size. In a case where the pressure is lower than 5 MPa, the resin particle liquid dispersion can not pass smoothly in the coiled pipeline. In a case where the pressurizing pressure exceeds 100 MPa, aggregation of the resin particles scarcely occurs.

For the coiled pipeline for passing the resin particle slurry, a coiled pipeline 50 shown in FIG. 5 can be used. The number of turns of coil of the coiled pipeline 50 is preferably 1 to 200, more preferably, 5 to 80 and, particularly preferably, 20 to 60. In a case where the number of turns of coil is less than 1, aggregation occurs net for the resin particles but for the aggregated particles having an appropriate particle size to thereby form coarse particles. In a case where the number of turns of the coil exceeds 200, since the application time of the centrifugal force is made longer, particle size control becomes difficult. As a result, yield of aggregated particles having an appropriate particle size is lowered. Within a range for the number of turns of the coil of 20 to 60, particle size control is particularly easy, and aggregated particles of uniform shape and particle size can be obtained at a good yield. Further, while the coil radius for one coil is not particularly restricted, it is, preferably, 25 mm to 200 mm and, particularly preferably, 30 mm to 80 mm. In a case where the coil radius is less than 25 mm, an angular velocity becomes predominant, that is, a circular movement becomes predominant in the flow channel of the coiled pipeline 50 and the resin particles tend to be localized stably at the inner wall surface and the vicinity thereof in the flow channel. As a result, excess aggregation of the resin particles tends to occur, which makes the particle size control difficult, and lowers the yield of the aggregated particles having an appropriate particle size. In a case where the coil radius exceeds 200 mm, centrifugal force increases in the flow channel, the turbulence less occurs and the chance of collision between the resin particles to each other is decreased and the aggregation of the resin particles less occurs. Accordingly, the particle size control becomes difficult to lower the yield of aggregated particles having an appropriate particle size.

Further, a pitch angle is preferably 10° to 30°. The pitch angle is an angle between a plane perpendicular to the free height 151 of the coiled pipeline 50 and the coiled pipeline in FIG. 5, which represents the slant of the coil. In a case where the coil angle is less than 10°, since the coil distance is excessively short, the amount of a heat medium flowing between adjacent pipes is less than the amount of a heat medium flowing along the outer circumferential surface of the coiled pipeline 50 and the inner circumferential surface of the coiled pipeline 50 in the coiled pipeline 50, to cause unevenness in the temperature of the resin particle slurry passing through the coiled pipeline 50. In a case where the coil angle is more than 30°, no sufficient centrifugal force can be obtained and the entire length of the coil is rather increased, so that it is difficult to handle it as the heater. The length of the entire coil is the entire length of a pipe-shaped member.

Figure 11A:
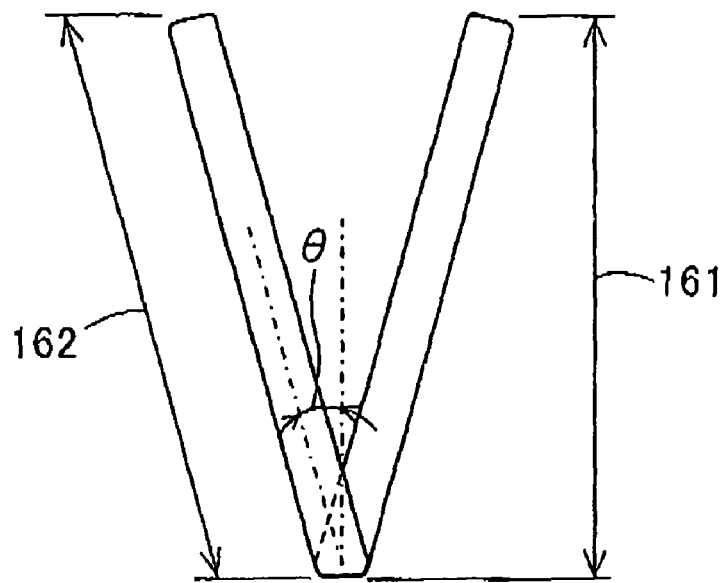
FIGS. 11A and 11B are views each explaining the method of determining a ½ coil pitch and an entire coil length.
Figure 11B:
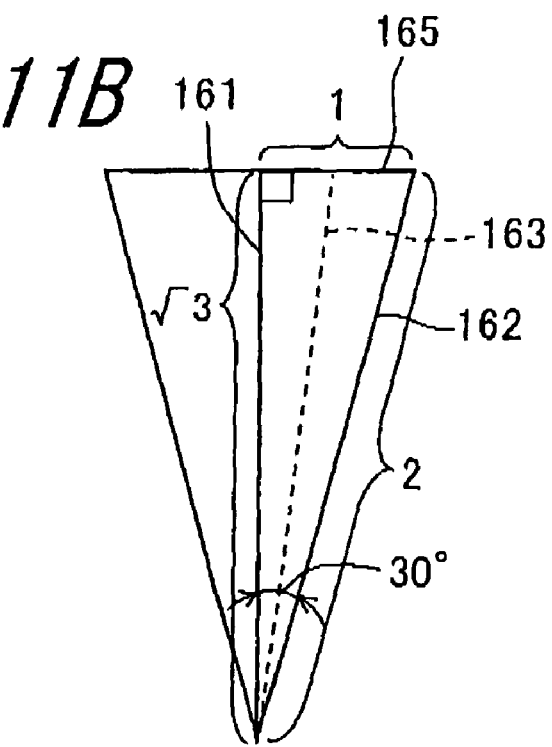

FIG. 11A and FIG. 11B are views for explaining the method of determining a ½ coil pitch 160 and an entire coil length. The ½ coil pitch 160 and the entire coil length can be calculated based on the coil radius of curvature 154 of the coiled pipeline 50 and, the number of turns and the pitch angle. In FIG. 11A, the entire coil length can be expressed as described below by using the coil radius of curvature 154, the number of turns, and the gradient ratio:

(Entire coil length)=2π×(coil radius of curvature 154)×(number of turns)×(gradient ratio)

The gradient ratio is a ratio of the actual coil height 162 to the height 161 in the perpendicular direction and represented by the following equation.

(Gradient ratio)=(actual coil height 162)/(height 161 in the perpendicular direction)

The ½ coil pitch 160 and the entire coil length can be determined as described below assuming the pitch angle θ representing the pitch angle for the coiled pipeline 50 as 30°, the coil radius of curvature 154 as 40 mm, and the number of turns as 50.

In FIG. 11B, in a right triangle formed of a perpendicular height 161, an actual coil height 162, and a bottom 165 as a line connecting the perpendicular height 161 and the actual coil height 162, when the bottom 165 is equally bisected as shown by a dotted line 163, a right triangle with an acute angle of 15° is formed and the ratio for three sides is 0.5:√3:1.8 from the shorter side.

The actual coil height 162 is twice the coil radius of curvature 154, that is, 40×2, and x for the ½ coil pitch 160 is determined as described below.

√3:0.5=40×2:x x=11.5 (mm)

Since the gradient ratio is (1.8/√3), the entire coil length is determined as below.

Entire coil length=2×π×40×50×1.8/√3=26105.4(mm)

While the reason why aggregation occurs by the passage of the resin particle slurry in the heated and pressurized state through the coiled pipeline 50 is not always apparent, it may be considered as below. In the flow channel of a linear pipeline, the resin particle liquid dispersion passes while forming a laminar flow. In the laminar flow, particles of large particle size flow being aligned substantially orderly at the center of the flow channel and particles of small particle size flow near the inner wall surface of the flow channel being aligned substantially orderly. In this case, since the flow is not disturbed, the particles less collide against each other to scarcely cause aggregation. On the other hand, in a case where the resin particle liquid dispersion is introduced in the flow channel of the coiled pipeline 50, the centrifugal force directing outward of the flow channel increases near the inner wall surface in the flow channel. On the contrary, a turbulence occurs at the center of the flow channel since the centrifugal force and the shearing force are applied. Particles of large particle size gather near the inner wall surface of the flow channel by the centrifugal force, pass being aligned substantially orderly without showing irregular behavior since the centrifugal force is strong, particles less collide against each other and coagulation less occurs. On the other hand, since particles of small diameter (or mass) such as resin particles pass while being involved in the turbulence at the central portion of the flow channel, the frequency of collision between the particles to each other increases and aggregation occurs frequently. Then, when the aggregated particles grow to an appropriate size, the aggregated particles move by the centrifugal force to the vicinity of the inner wall surface of the flow channel to prevent occurrence of excess aggregation of the resin particles. In this way, only the resin particles can be aggregated substantially selectively while preventing the occurrence of coarse particles caused by the excess aggregation as much as possible.

The resin particle liquid dispersion passing through the coiled pipeline 50 is depressurized to an atmospheric pressure or a pressure approximate thereto so as not to generate bubbling due to bumping. Particle size is controlled in parallel with pressurization. The particle size control is conducted mainly for the reduction of the diameter of the coarse particles. Accordingly, the aggregated particle liquid dispersion after depressurization scarcely contain coarse particles, but contains aggregated particles substantially uniform in the shape and the particle size and the liquid temperature is about 50 to 80° C.

Figure 12:
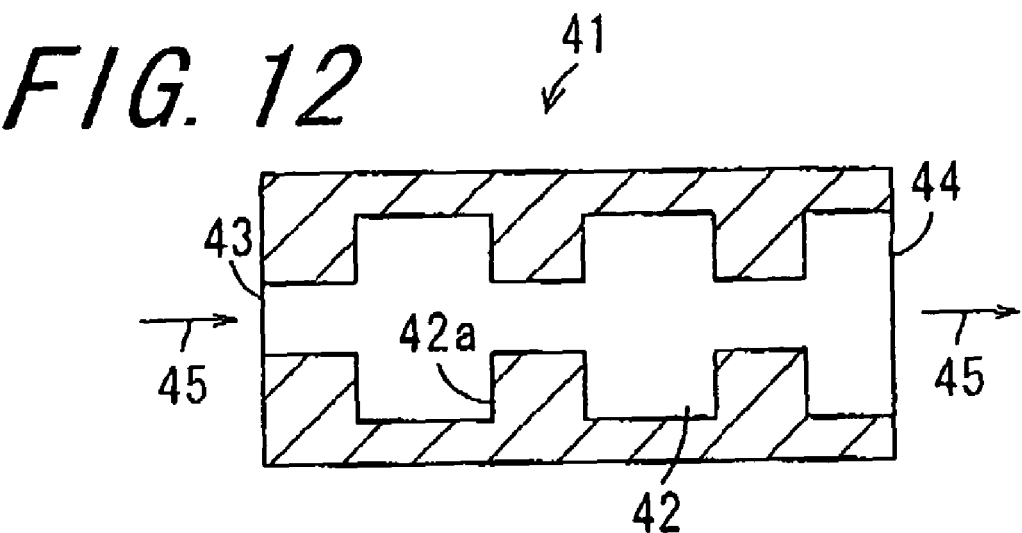
FIG. 12 is a longitudinal cross sectional view schematically showing the constitution of a depressurizing nozzle.

Depressurization of the aggregated particle liquid dispersion is conducted, for example, by using a depressurizing nozzle. As the depressurizing nozzle, a depressurizing nozzle 41, for example, shown in FIG. 12 can be used. FIG. 12 is a longitudinal cross sectional view schematically showing the constitution of the depressurizing nozzle 41. In the depressurizing nozzle 41, a flow channel 42 is formed so as to penetrate the inside in the longitudinal direction. The flow channel 42 has an inlet 43 at one end and an exit 44 at the other end in the longitudinal direction. An aggregated particle liquid dispersion in the heated and pressurized state is introduced from the inlet 43 into the depressurizing nozzle 41, and the aggregated particle slurry depressurized and in the heated state is discharged from the exit 44 outward of the depressurizing nozzle 41. The flow channel 42 is formed such that the longitudinal axial line is aligned with the longitudinal axial line of the depressurizing nozzle 41 and the exit diameter is larger than the inlet diameter. Further in this embodiment, the flow channel 42 is formed such that portions having relatively small cross sectional diameters and portions having relatively large cross sectional diameters in the direction perpendicular to the slurry passing direction (direction arrow 45) are continued alternately. Further, it is formed such that the portion near the inlet 43 has a relatively smaller cross sectional diameter and the portion near the exit 44 has a relatively large cross sectional diameter in the flow channel 42. When an aggregated particle slurry in the heated and pressurized state is introduced from the inlet 43 to the flow channel 42 of the depressurizing nozzle 41, the slurry passes through the flow channel 42 while undergoing depressurization. Then, among the aggregated particles, only those having excessively large particle size are in contact with the inner wall surface 42a of the flow channel 42, excess fine resin particles are dissociated to form aggregated particles of appropriate sizes and they are discharged from the exit 44. In the depressurizing nozzle 41, since the exit diameter is larger than the inlet diameter in the flow channel 42, appropriate shearing force is applied by the contact of the slurry to the inner wall surface 42a. Accordingly, only the aggregated particles of excessively large particle size (coarse particles) undergo the particle size control.

Figure 13:
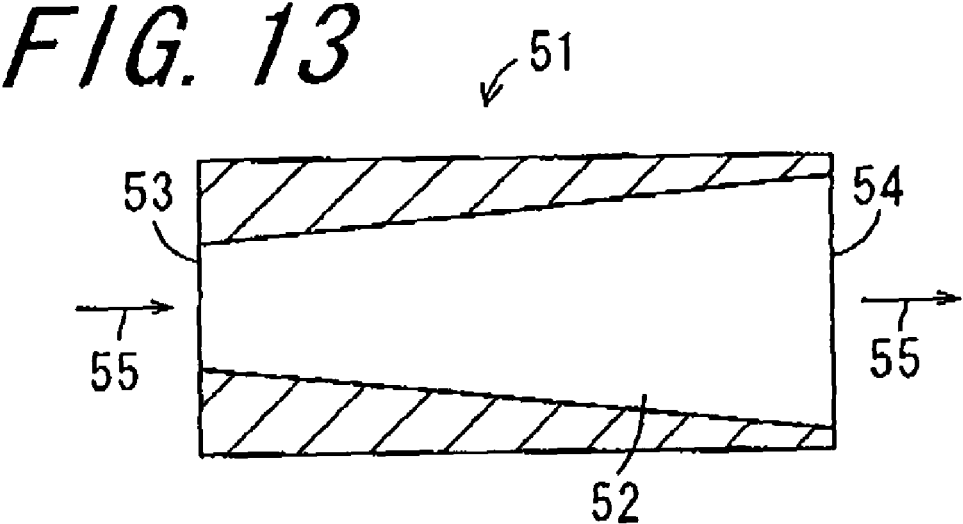
FIG. 13 is a longitudinal cross sectional view schematically showing the constitution of a depressurizing nozzle according to another embodiment.

In this embodiment, the depressurizing nozzle 41 is not restrictive but various kinds of depressurizing nozzles having a flow channel formed such that the exit diameter is larger than the inlet diameter can be used. By making the exit diameter larger than the inlet diameter, formation of coarsely grown particles due to reaggregation of aggregated particles pulverized appropriately in the depressurizing nozzle can be prevented. FIG. 13 is a longitudinal cross sectional view schematically showing the constitution of a depressurizing nozzle 51 according to another embodiment. In the depressurizing nozzle 51, a flow channel 52 is formed so as to penetrate the inside thereof in the longitudinal direction. The flow channel 52 has an inlet 53 at one end and an exit 54 at the other end. The flow channel 52 is formed such that the longitudinal axial line is aligned with the longitudinal axial line of the depressurizing nozzle 51 and the exit diameter is larger than the inlet diameter. Further, in this embodiment, the cross sectional diameter in the direction perpendicular to the passing direction of the liquid dispersion (direction of arrow 55) gradually increases continuously from the inlet 53 to the exit 54 in the flow channel 52. The depressurizing nozzle 51 has the same effect as the depressurizing nozzle 41. Further in this embodiment, the depressurizing nozzle is not restrictive but the depressurizing module 7 in the pulverizing high pressure homogenizer can 1 also be used.

The coiled pipeline and the depressurizing nozzle or the depressurizing module are preferably provided alternately being arranged in a plurality of sets. This can conduct aggregation and depressurization alternately and repetitively to further make the shape and the particle size of the aggregated particles uniform. Further, in a case where the coiled pipelines and the depressurizing nozzles or the depressurizing modules are alternately arranged in plurality of sets, the coiled pipelines adjacent to each other by way of the depressurizing nozzle or the depressurizing module are made different from each other in view of the turning direction of the coils. This increases the frequency of collision between the resin particles to each other and the resin particles can be aggregated more efficiently.

Then, the aggregated particle slurry at a liquid temperature of about 50 to 80° C. obtained by passage through the coiled pipeline and the depressurizing nozzle or the depressurizing module is cooled, for example, to a room temperature thereby completing the aggregating step. The aggregating step may be conducted for plural times till the particle size of the aggregated particle reaches a preferred particle size.

Figure 14:
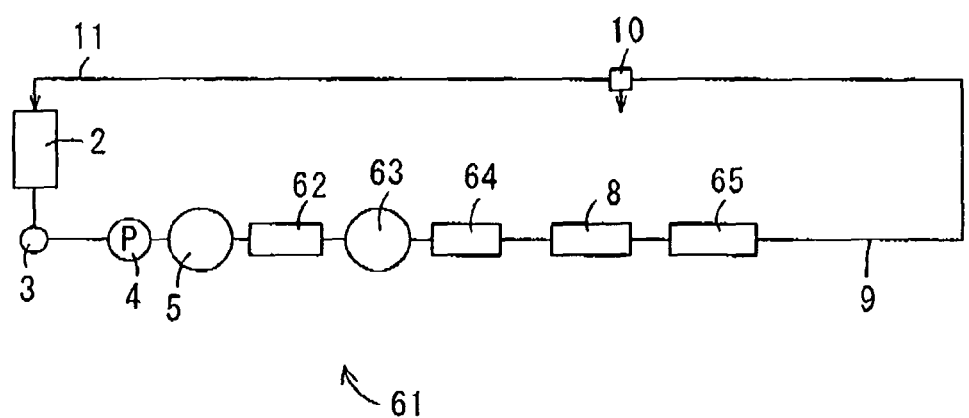
FIG. 14 is a system chart schematically showing the constitution of an aggregating high pressure homogenizer for practicing the aggregating step in the method of manufacturing aggregated particles.

The aggregating method of the resin particles described above can be conducted, for example, by using a high pressure homogenizer described in WO03/059497. FIG. 14 is a systematic chart schematically showing the constitution of an aggregating high pressure homogenizer 61 for conducting the aggregating step in the manufacturing method of the aggregated particles. The aggregating high pressure homogenizer 61 is similar with the pulverizing high pressure homogenizer 1 in which corresponding portions carry identical references for which description are to be omitted. The aggregating high pressure homogenizer 61 is different from the pulverizing high pressure homogenizer 1 in that it does not include the pulverizing nozzle 6 but includes a first depressurizing module 62, a second depressurizing module 64, and a third depressurizing module 65 different from the depressurizing module 7, and contains a first coiled pipeline 63. The aggregating high pressure homogenizer 61 is a high pressure homogenizer not pulverizing the particles but aggregating the particles. The aggregating high pressure homogenizer 61 includes a tank 2, a delivery pump 3, a pressurizing unit 4, a heater 5, a first depressurizing module 62, a first coiled pipeline 63, a second depressurizing module 64, a cooler 8, a third depressurizing module 65, a pipeline 9, and a take-out port 10.

In the aggregating high pressure homogenizer 61 the tank 2, the delivery pump 3, the pressurizing unit 4, the heater 5, the first depressurizing module 62, the first coiled pipeline 63, the second depressurizing module 64, the cooler 8, and the third depressurizing module 65 are connected in this order by way of the pipeline 9. In the system connected by the pipeline 9, the resin particle liquid dispersion after cooling by the cooler 8 may be taken out from the take-out port 10 to the outside of the system, or the slurry after cooling by the cooler 8 may be returned again to the tank 2 and circulated repetitively in the direction of an arrow 11.

The tank 2, the delivery pump 3, and the pressurizing unit 4 identical with those in the pulverizing high pressure homogenizer 1 are used. The resin particle liquid dispersion in the tank 2 is delivered in the pressurized state by the delivery pump 3 and the pressurizing unit 4 to the heater 5. Also the heater 5 identical with that in the pulverizing high pressure homogenizer 1 is used. That is, a heater 5 having a coiled pipeline 50 shown in FIG. 5 and a heating section (not shown) are used. Both ends of the coiled pipeline 50 are connected respectively to the pipeline 9. The resin particle liquid dispersion is put to the heated and pressurized state by passage in the heater 5 and supplied to the first depressurizing module 62.

For the first depressurizing module 62, a depressurizing nozzle is used for instance. The depressurizing nozzle is a nozzle in which a flow channel is formed so as to penetrate the inside in the longitudinal direction. The flow channel has an inlet at one end and an exit at the other end in the longitudinal direction, and the exit diameter is larger than the inlet diameter. The inlet and the exit are connected respectively to the pipeline 9, a slurry in the heated and pressurized state is introduced from the inlet into the flow channel, and a depressurized slurry is discharged from the exit. The depressurizing nozzle includes, for example, the depressurizing nozzles 41, 51, etc. Instead of the depressurizing nozzle, the depressurizing module 7 in the pulverizing high pressure homogenizer 1 can also be used. Coarse particles formed in the heater 5 are pulverized by the first depressurizing module 62.

In the first coiled pipeline 63, the aggregating step of the resin particles is conducted to obtain an aggregated particle liquid dispersion. In the second depressurizing module 64, the depressurizing step is conducted. That is, the aggregated particle liquid dispersion is depressurized and only the coarse particles are pulverized selectively to conduct particle size control for the aggregated particles. In the cooler 8, the cooling step is conducted to cool the aggregated particles liquid dispersion. The cooler 8 identical with that in the pulverizing high pressure homogenizer 1 is used. The cooled aggregated particle slurry again undergoes particle size control in the third depressurizing module 65 to obtain aggregated particles of the invention.

According to the aggregating high pressure homogenizer 61, a resin particles slurry is at first filled in the tank 2, and after addition of the cationic coagulant, introduced to the coiled pipeline of the heater 5 to be put to the heated and pressurized state. Then, after undergoing pulverization for the coarse particles by the first depressurizing module 62, centrifugal force and shearing force are applied to the resin particles under heating and pressurization by the first coiled pipeline 63, by which resin particles are selectively aggregated to form an aggregated particle slurry. The aggregated particle slurry is then introduced to the second depressurizing module 64, undergoes depressurization, and the resin particles are detached from the aggregated particles having an excessively large particle size to make the particle size and the shape of the aggregated particles uniform. The aggregated particle slurry is introduced into the cooler 8 and, after cooling, undergoes the particle size control again in the third depressurizing module 65. Thus, the coagulant adding stage, the depressurizing stage, and the cooling stage in the aggregating step are completed. The series of steps described above may be conducted repetitively. In this case, the aggregated particle slurry obtained in the cooling stage is circulated again to the tank 2 and then subjected to the identical treatment.

Figure 15:
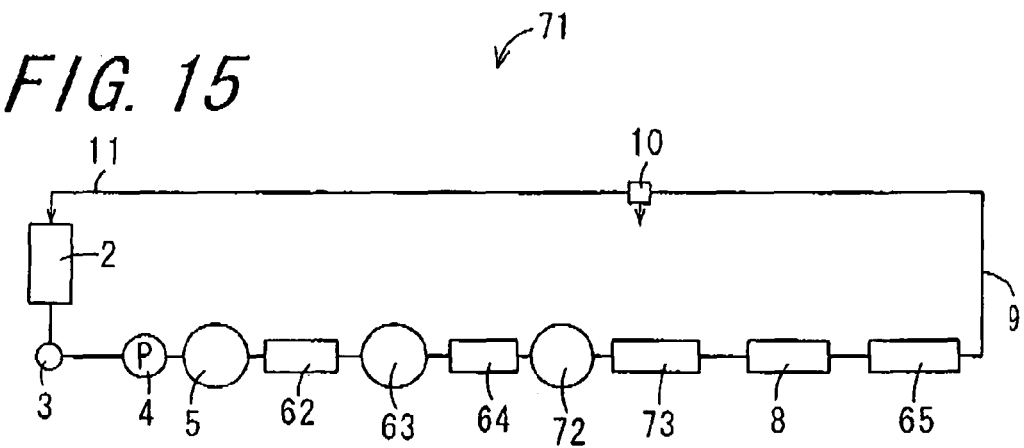
FIG. 15 is a system chart schematically showing the constitution of an aggregating high pressure homogenizer according to another embodiment.

FIG. 15 is a systematic chart schematically showing the constitution of an aggregating high pressure homogenizer 71 of other embodiment. The aggregating high pressure homogenizer 71 is similar with the aggregating high pressure homogenizer 61 in which corresponding portions carry identical reference numerals for which descriptions are to be omitted. The aggregating high pressure homogenizer 71 has a second coiled pipeline 72 and a fourth depressurizing module 73 provided between the second depressurizing module 64 and the cooler 8 in the aggregating high pressure homogenizer 61. The second coiled pipeline 72 is identical with that explained for the aggregating step. The depressurizing module 73 is identical with that for the first depressurizing module 62. According to the aggregating high pressure homogenizer 71, aggregation of the resin particles and the particle size control (decrease in the diameter) of the aggregated particles having an excessively large particle size can be conducted repetitively by using the coiled pipeline and the depressurizing module as 1 set and providing the set in plurality. Accordingly, the particle size of the aggregated particles are made more uniform and the width of the particle size distribution of the finally obtained aggregated particles is further narrowed.

In this embodiment, while the aggregated particles are manufactured by using the high pressure homogenizer, aggregation of the resin particles is not restricted thereto but may also be conducted by using usual mixing apparatus, for example a batchwise emulsifying machine or dispersing machine.

[Washing Step]

When the aggregating step S4 is completed, it goes to the washing step S5. In the washing step of step S5, aggregated particles are separated from the aggregated particle liquid dispersion, washed and then dried to obtain aggregated particles. For the separation of the aggregated particles, usual solid-liquid separation apparatus such as filtration, centrifugal separation or decantation can be adopted. The aggregated particles are washed for removing not-aggregated resin particles, the anionic surfactant, the cationic surfactant, less soluble inorganic particles, monovalent metal salt, etc. Specifically, washing is conducted by using, for example, pure water at a conductivity of 20 μS/cm or lower. The aggregated particles and the pure water are mixed and washing with the pure water described above is conducted repetitively till the conductivity of washing water left after the separation of the aggregated particles from the mixture lowers to 50 μS/cm or less. By drying after washing, aggregated particles comprising the resin particles obtained by the manufacturing method of the resin particles of the invention are obtained.

The thus obtained aggregated particles have a number average particle size, preferably, of about 3 to 6 μm, are uniform in the shape and the particle size, and has an extremely narrow particle size distribution width. For obtaining aggregated particles with the number average particle size of about 3 to 6 μm, it is important, for example, to complete the aggregating step at an optimal time.

In a case of using the finally obtained aggregated particles as a toner, a polyester is preferred among the synthetic resins described for the mixture preparing step S1 described above. Since the polyester is excellent in the transparency and can provide good powder fluidity, low temperature fixing property, and secondary color reproducibility to the aggregated particles, it is suitable to the binder resin for color toner. Further, the polyester and the acrylic resin may be grafted and used. Among the synthetic resins described above, synthetic resins having a softening temperature of 150° C. or lower are preferred and synthetic resins with a softening temperature of 60° C. to 150° C. are particularly preferred while considering easy granulating operation to the resin particles, kneading property between the synthetic resin and the additive, and making the shape and the size of the resin particles more uniform. Further, among them, synthetic resins with the weight average molecular weight of 5,000 to 500,000 are preferred. The synthetic resins may be used each alone or two or more of them may be used in combination. Further, even for an identical resin, plural kinds of resins different in one or all of the molecular weight and the monomer composition etc. can be used.

In a case of using the finally obtained aggregated particles as a toner, a colorant, a release agent, a charge controller, etc. are preferably contained in the synthetic resin. The colorant is not particularly restricted and, for example, organic dyes, organic pigments, inorganic dyes, and inorganic pigments can be used.

The black colorant includes, for example, carbon black, copper oxide, manganese dioxide, aniline black, activated carbon, non-magnetic ferrite, magnetic ferrite, and magnetite.

The yellow colorant includes, for example, chrome yellow, yellow zinc, cadmium yellow, yellow iron oxide, mineral fast yellow, nickel titanium yellow, navel yellow, naphthol yellow S, hansa yellow G, hansa yellow 10G, benzidine yellow G, benzidine yellow GR, quinoline yellow lake, permanent yellow NCG, tartrazine lake, C.I. pigment yellow 12, C.I. pigment yellow 13, C.I. pigment yellow 14, C.I. pigment yellow 15, C.I. pigment yellow 17, C.I. pigment yellow 93, C.I. pigment yellow 94, and C.I. pigment yellow 138.

The orange colorant includes, for example, red chrome yellow, molybdenum orange, permanent orange GTR, pyrazolone orange, Vulkan orange, Indanthrene brilliant orange RK, benzidine orange G, Indanthrene brilliant orange GK, C.I. pigment orange 31, and C.I. pigment orange 43.

The red colorant includes, for example, red iron oxide, cadmium red, minium, mercury sulfide, cadmium, permanent red 4R, Lithol red, pyrazolone red, watching red, calcium salt, lake red C, lake red D, brilliant carmine 6B, eosin lake, rhodamine lake B, alizarin lake, brilliant carmine 3B, C.I. pigment red 2, C.I. pigment red 3, C.I. pigment red 5, C.I. pigment red 6, C.I. pigment red 7, C.I. pigment red 15, C.I. pigment red 16, C.I. pigment red 48:1, C.I. pigment red 53:1, C.I. pigment red 57:1, C.I. pigment red 122, C.I. pigment red 123, C.I. pigment red 139, C.I. pigment red 144, C.I. pigment red 149, C.I. pigment red 166, C.I. pigment red 177, C.I. pigment red 178, and C.I. pigment red 222.

The purple colorant includes, for example, manganese purple, fast violet B, and methyl violet lake.

The blue colorant includes, for example, Prussian blue, cobalt blue, alkali blue lake, Victoria blue lake, phthalocyanine blue, nonmetal phthalocyanine blue, phthalocyanine blue partially chloride, fast sky blue, Indanthrene blue BC, C.I. pigment blue 15, C.I. pigment blue 15:2, C.I. pigment blue 15:3, C.I. pigment blue 16, and C.I. pigment blue 60.

The green colorant includes, for example, chrome green, chrome oxide, pigment green B, malachite green lake, final yellow-green G, and C.I. pigment green 7.

The white colorant includes, for example, zinc powder, titanium oxide, antimony white, and compounds such as zinc sulfide.

Colorants may be used each alone or two or more colorants of different colors may be used in combination. Further, also for the colorants of an identical color, two or more of them may be used in combination. While the content of the colorant in the resin particles is not particularly restricted, it is preferably 0.1 to 20% by weight, and more preferably, 0.2 to 10% by weight based on the entire amount of the resin particles.

Also the release agent is not particularly restricted and includes, for example, petroleum type waxes such as paraffin wax, and derivatives thereof and microcrystalline wax and derivatives thereof; hydrocarbon type synthesis waxes such as Fischer-Tropsch wax and derivatives thereof, polyolefin wax and derivatives thereof, low molecular weight polypropylene wax and derivatives thereof; polyolefin type polymer wax (low molecular weight polyethylene wax, etc.) and derivatives thereof; plant type waxes such as carnauba wax and derivatives thereof, rice wax and derivatives thereof, Candelilla wax and derivatives thereof, and Japan wax; animal waxes such as bees wax and whale wax; oil and fat type synthetic waxes such as aliphatic acid amide and esters of phenol and fatty acid; long chained carboxylic acid and derivatives thereof; long chained alcohols and derivatives thereof; silicone type polymers; and higher fatty acids. The derivatives include oxides, block copolymers of vinylic monomers and waxes, and grafting modification products of vinylic monomers and waxes. Among them, waxes having a melting point of a liquid temperature or higher of a water soluble dispersant aqueous solution in the granulating step are preferred. While the content of the release agent in the resin particles is not particularly restricted and can be selected properly from a wide range, it is preferably 0.2 to 20% by weight based on the entire amount of the resin particles.

Also the charge controller is not particularly restricted and those for positive charge control and negative charge control can be used. The charge controller for positive charge control includes, for example, basic dye, quaternary ammonium salt, quaternary phosphonium salt, aminopyrine, pyrimidine compounds, polynuclear polyamino compound, aminosilane, nigrosine dye and derivative thereof, triphenyl methane derivatives, guanidine salts, and amidine salts. The charge controller for negative charge control includes, oil soluble dyes such as oil black and spilon black, metal-containing azo compounds, azo complex dyes, naphthenic acid metal salts, metal complexes and metal salts of salicylic acid and derivatives thereof (metal including chromium, zinc, zirconium, etc.), fatty acid soaps, long chained alkyl carboxylic acid salts, and resin acid soap. The charge controllers may be used each alone or two or more of them may be used optionally in combination. While the content of the charge controller in the resin particle is not particularly restricted and can be selected properly from a wide range, it is preferably 0.5% by weight to 3% by weight or based on the entire amount of the resin particles.

The aggregated particles manufactured according to the method of manufacturing aggregated particles as described above are dense aggregated particles having small particle size, a narrow width of particle size distribution and with less bubbles in the inside of the aggregated particles. Accordingly, when such aggregated particles are used as a toner in electrophotographic image forming apparatus such as copying machines, laser beam printers, and facsimile units, since the chargeability, the developability, and the transferability are uniform, and the mechanical strength is high for individual particles and since the occurrence of excess fine particles due to pulverization in a case of applying external force, that is, in a case of stirring the toner for charging the developer in the image forming apparatus, images of high resolution and high fineness with less toner scattering can be formed and such properties are maintained for a long time. Further, the aggregated particles formed of resin particles obtained by the method of the manufacturing resin particles manufactured according to the invention can be used, in addition to the toner also as fillers for the paint material and the coating agent.

EXAMPLE

The invention is to be described specifically referring to examples and comparative examples. In the followings, "parts" and "%" mean "parts by weight" and "% by weight" respectively unless otherwise specified.

The melting point of the wax in the example is determined as below.

[Melting Point of Wax]

A differential scanning calorimeter (DSC220, tradename of products manufactured by Seiko Instruments Inc.) was used and a procedure of elevating the temperature of one g of specimen from 20° C. to 150° C. at a temperature elevation rate of 10° C. per min and then rapidly cooling from 150° C. to 20° C. was repeated twice to measure the DSC curve. The temperature at the apex of an endothermic peak corresponding to the melting on the DSC curve measured by the second operation was determined as a melting point for the wax.

Example 1

Mixture Preparing Step 87.5 parts of a polyester resin (glass transition temperature (Tg): 60° C., softening point Tm: 110° C.), 1.5 parts of a charge controller (TRH, trade name of products manufactured by Hodogaya Chemical Industry Co.), 3 parts of a polyester wax (melting point: 85° C.) and 8 parts of a colorant (C.I. pigment red 57:1) were mixed in a mixer (Henschel mixer, trade name of products manufactured by Mitsui Mining Col.), and melt kneaded in a twin screw extruder (PCM-30, trade name of products manufactured by Ikegai Co.) at a cylinder temperature of 145° C. and a number of barrel rotation of 300 rpm. After cooling the melt kneaded raw material to a room temperature, it was pulverized by a cutter mill (VM-16, trade name of products manufactured by Seishin Enterprice Co.) to prepare a molten kneaded product with a volume average particle size of 50 μm and a maximum particle size of 300 μm. The molten kneaded product had a ½ softening point Tm of 110° C. 30 g of the molten kneaded product, 3 g of sodium dodecylbenzene sulfonate (LUNOX S-100, trade name of products of anionic surfactant manufactured by Toho Chemical Industry Co.), and 567 g of water were mixed to prepare a mixture of a molten kneaded product containing a synthetic and an aqueous medium containing a surfactant.

[Coarsely-Pulverizing Step]

The mixture obtained in the mixture preparing step was charged in a tank of a high pressure homogenizer (NANO3000, trade name of products manufactured by Beryu Co. Ltd.), and a pulverization of circulating the mixture in a high pressure homogenizer for 10 min at a temperature of 25° C. and under a pressure of 100 MPa was conducted for 3 passes, to obtain a coarse pulverizate liquid dispersion.

[Finely-Granulating Step]

The coarse pulverizate liquid dispersion obtained in the coarsely-pulverizing step was charged in a tank of a high pressure homogenizer (NANO3000, trade name of products manufactured by Beryu Co. Ltd.) and a treatment of circulating the same in the high-pressure homogenizer for 10 min while keeping a temperature at 120° C. and under a pressure of 160 MPa is conducted for 5 passes to obtain a resin particle liquid dispersion. The obtained resin particles had a volume average particle size of 1 μm and a coefficient of variation (CV value) of 35%.

[Aggregating Step]

100 ml of a resin particle liquid dispersion obtained in the finely-granulating step was transferred to a flask and put to a stirring treatment for 2 hours with addition of 0.1 g of sodium chloride (guaranteed sodium chloride, trade name of products manufactured by Kishida Chemical Co. Ltd.) to aggregate resin particles and obtain an aggregating particle liquid dispersion. The obtained aggregating particles had a volume average particle size of 5.1 μm and a coefficient of variation (CV value) of 26%.

Example 2

Mixture Preparing Step

A mixture was prepared in the same manner as in the mixture preparing method of Example 1.

[Coarsely-Pulverizing Step]

A coarse particle liquid dispersion was prepared in the same manner as in the preparing method for the coarse pulverizate liquid dispersion in Example 1 except for conducting the coarsely-pulverizing treatment for 5 passes at a temperature of the mixture of 67° C.

[Finely-Granulating Step]

A resin particle liquid dispersion was prepared in the same manner as in the preparing method for the resin particles liquid dispersion of Example 1 to obtain resin particle having a volume average particle size of 1 μm and a coefficient of variation (CV value) of 34%.

[Aggregating Step]

The aggregated particle liquid dispersion was prepared in the same manner as preparing method for the aggregated particle liquid dispersion of Example 1 to obtain aggregated particles. The obtained aggregated particles had a volume average particle size of 5.4 μm and a coefficient of variation (CV value) of 22%.

Example 3

Mixture Preparing Step

A mixture was prepared in the same manner as in the mixture preparing method of Example 1.

[Coarsely-Pulverizing Step]

A coarse pulverizate liquid dispersion was prepared in the same manner as the preparing method for the coarse pulverizate liquid dispersion in Example 1 except for changing sodium dodecylbenzene sulfonate to 1 g and water to 569 g and conducting the coarsely pulverizing treatment of circulating the mixture in a high pressure homogenizer for 10 minutes at a temperature of 25° C. and under a pressure of 25 MPa for 9 passes.

[Finely-Granulating Step]

A resin particle liquid dispersion was prepared in the same manner as the preparing method for the resin particle liquid dispersion in Example 1 to obtain resin particles having a volume average particle size of 1 μm and a coefficient of variation (CV value) of 31%.

[Aggregating Step]

An aggregated particle liquid dispersion was prepared in the same manner as the preparing method for the aggregated particle liquid dispersion of Example 1 to obtain aggregated particles. The aggregated particles had a volume average particle size of 5.1 μm and a coefficient of variation (CV value) of 27%.

Example 4

Mixture Preparing Step 2000 g of starting materials for a molten kneaded product blended at a ratio of 82.0 parts of a polyester resin (binder resin, glass transition temperature (Tg): 60° C., melting point: 116° C.), 2.0 parts of a charge controller (N5P, trade name of products manufactured by Clariant Japan KK), 7.5 parts of a polyester wax (release agent, melting point: 85° C., HNP-10, trade name of products manufactured by Nippon Seiro Co. Ltd.), and 8.5 parts of a colorant (KET BLUE111, manufactured by Dai Nippon Ink Inc.) was mixed in a Henschel mixer (mixer: FM mixer, trade name of products manufactured by Mitsui Mining Co.) for 3 min, and melt kneaded in an open roll type continuous kneader (MOS320-1800, trade name of products manufactured by Mitsui Mining Co.). As the conditions set for the open roll in this case, the temperature of the heating roll was 140° C. on the supply side and 90° C. on the discharge side, and the temperature of the cooling roll was 60° C. on the supply side and 55° C. on the discharge side.

[Preliminarily-Pulverizing Step]

240 parts of the molten kneaded product prepared in the kneaded product preparing step, 506.6 parts of ion exchange water, 0.5 part of sodium dioctyl sulfosuccinate (AEROLE; surfactant, AEROLE CT-1P, trade name of products manufactured by Toho Chemical Industry Co., Ltd.), 39.9 parts of polyacrylic acid (surfactant, Disroll H14-N, trade name of products manufactured by Nippon Nyukazai Co. Ltd.), and 13 parts of xanthan gum (viscosity improver) were wet-pulverized by a foamless mixer (trade name of products manufactured by Beryu Co. Ltd.) at a number of rotation of 2000 rpm for 10 min.

[Defoaming Step]

The slurry of the molten kneaded product obtained in the preliminarily-pulverizing step was deaerated by depressurization to 0.1 MPa by a T. K. HIVISDUPPER Model 3 (trade name of products manufactured by Primix Corp). The apparatus is a continuous type defoaming apparatus. The amount of dissolved oxygen in the slurry of the molten kneaded product was 7.5 mg/L.

[Coarsely-Pulverizing Step]

The slurry of the defoamed molten kneaded product was charged in a high pressure homogenizer (Soundless high pressure emulsifying apparatus NANO3000, trade name of products manufactured by Beryu Co. Ltd.) and a treatment of coarse pulverization while keeping at a temperature of 25° C. and under a pressure of 100 MPa was conducted for 1 pass.

[Finely-Granulating Step]

The coarse pulverizate liquid dispersion was charged in a high pressure homogenizer (Soundless high pressure emulsifying apparatus NANO3000, trade name of products manufactured by Beryu Co. Ltd.) and a treatment of pulverization while keeping a temperature at 165° C. and under a pressure of 168 MPa was conducted for 1 pass and the resin particles were isolated from the resin particle liquid dispersion to obtain resin particles. The obtained particles had a volume average particle size of 1.47 μm and a coefficient variation (CV value) of 48%.

[Aggregating Step]

At a room temperatures the resin particle liquid dispersion obtained in the finely-granulating step and sodium chloride were mixed at a ratio of 100:3, which was charged in a high pressure homogenizer (Soundless high pressure emulsifying apparatus NANO3000, trade name of products manufactured by Beryu Co. Ltd.), and the treatment of aggregating the mixture while keeping the temperature at 85° C. and under a pressure of 15 MPa was conducted for 1 pass.

[Washing Step]

The aggregated particle liquid dispersion obtained in the aggregating step was washed with pure water and, after washing till the conductivity of the liquid dispersion after washing was lowered to 50 μS/cm or less, it was dried by a jet oven to obtain aggregated particles having a volume average particle size of 6.3 μm and a coefficient variation (CV value) of 30%.

Example 5

Mixture Preparing Step

A molten kneaded product was prepared in the same manner as the preparing method for the molten kneaded product of Example 4.

[Preliminarily-Pulverizing Step]

Preliminary pulverizate of the molten kneaded product were obtained in the same manner as in Example 4 except for wet pulverizing the molten kneaded product and ion exchange water in a foamless mixer at a number of rotation of 2000 rpm for 5 min and then stirring with addition of AEROLE, polyacrylic acid, and xanthan gum at a number of rotation of 2000 rpm for 5 min to prepare a slurry of the molten kneaded product.

[Defoaming Step]

The amount of dissolved oxygen in the slurry of the obtained molten kneaded product was 6.9 mg/L.

[Coarsely-Pulverizing Step]

A coarse particle liquid dispersion was prepared in the same manner as the preparing method for the coarse particle liquid dispersion of Example 4.

[Finely-Granulating Step]

A resin particle liquid dispersion was prepared in the same manner as the preparing method for the resin particle liquid dispersion of Example 4. Thus, resin particles having a volume average particle size of 1.21 μm and a coefficient variation (CV value) of 42% were obtained.

[Aggregating Step]

An aggregated particle liquid dispersion was obtained in the same manner as the preparing method for the aggregated particle liquid dispersion of Example 4.

[Washing Step]

Aggregated particles were obtained in the same manner as the washing step for the aggregated particles of Example 4. The obtained aggregated particles had a volume average particle size of 5.5 μm and a coefficient variation (CV value) of 28%.

Example 6

Mixture Preparing Step

A molten kneaded product was prepared in the same manner as the preparing method for the molten kneaded product of Example 4.

[Preliminarily Pulverizing Step]

Preliminary pulverizate of the molten kneaded product were obtained in the same manner as in Example 4 except for wet pulverizing the molten kneaded product, ion exchange water, and xanthan gum in a foamless mixer at a number of rotation of 2000 rpm for 5 min and then stirring with addition of AEROLE, and polyacrylic acid, at a number of rotation of 2000 rpm for min to prepare a slurry of the molten kneaded product.

[Defoaming Step]

The amount of dissolved oxygen in the slurry of the obtained molten kneaded product was 7.2 mg/L.

[Coarsely-Pulverizing Step]

A coarse particle liquid dispersion was prepared in the same manner as the preparing method for the coarse particle liquid dispersion of Example 4.

[Finely-Granulating Step]

A resin particle liquid dispersion was prepared in the same manner as the preparing method for the resin particle liquid dispersion of Example 4. Thus, resin particles having a volume average particle size of 1.30 μm and a coefficient variation (CV valued of 39% were obtained.

[Aggregating Step]

An aggregated particle liquid dispersion was obtained in the same manner as the preparing method for the aggregated particle liquid dispersion of Example 4.

[Washing Step]

Aggregated particles were obtained in the same manner as the washing step for the aggregated particles of Example 4. The obtained aggregated particles had a volume average particle size of 5.7 μm and a coefficient variation (CV value) of 23%.

Example 7

Mixture Preparing Step

A molten kneaded product was prepared in the same manner as the preparing method for the molten kneaded product of Example 4.

[Preliminarily-Pulverizing Step]

Preliminary pulverizate of the molten kneaded product were obtained in the same manner as in Example 4 except for preparing a slurry of a molten kneaded product by wet-pulverizing a molten kneaded product, ion exchange water, and xanthan gum in a colloid mill apparatus (trade name of product manufactured by Nippon Ball Valve Co. Ltd.) at a number of rotation of 3600 rpm for a stirring time of 5 min and then stirred with addition of AEROLE and polyacrylic acid by a foamless mixer at a number of rotation of 2000 rpm for 5 min.

[Defoaming Step]

The amount of dissolved oxygen in the slurry of the obtained molten kneaded product was 6.8 mg/L.

[Coarsely-Pulverizing Step]

A coarse particle liquid dispersion was prepared in the same manner as the preparing method for the coarse particle liquid dispersion of Example 4.

[Finely-Granulating Step]

A resin particle liquid dispersion was prepared in the same manner as the preparing method for the resin particle liquid dispersion in Example 4. Thus, resin particles having a volume average particle size of 1.08 μm and a coefficient variation (CV value) of 35% were obtained.

[Aggregating Step]

An aggregated particle liquid dispersion was obtained in the same manner as the preparing method for the aggregated particle liquid dispersion in Example 4.

[Washing Step]

Aggregated particles were obtained in the same manner as the washing step for the aggregated particles of Example 4. The obtained aggregated particles had a volume average particle size of 5.3 μm and a coefficient variation (CV value) of 19%.

Comparative Example 1

Preparation of Molten Kneaded Product

A molten kneaded product was prepared in the same manner as the preparing method for the molten kneaded product of Example 1.

[Preparation of Coarse Particle Slurry]

A coarse particle slurry was prepared in the same manner as the preparing method for the coarse particle slurry of Example 1 except for conducting a pre-treatment of circulating the product at 8 passes in a high pressure homogenizer for 10 min at a temperature of 25° C. and under a pressure of 5 MPa.

[Preparation of Resin Particle Slurry]

A resin particle slurry was prepared in the same manner as the preparing method for the resin particle slurry of Example 1. Thus, resin particles having a volume average particle size of 50 μm and a coefficient variation (CV value) of 42% were obtained.

[Preparation of Aggregated Particle Slurry]

An aggregated particle slurry was prepared in the same manner as the preparing method for the resin particle slurry of Example 1. Thus, resin particles having a volume average particle size of 15.4 μm and a coefficient variation (CV value) of 53% were obtained.

Table 1 shows the property values and the evaluation result for the resin particles obtained in the examples and the comparative examples, and Table 2 shows the property values and the evaluation result for the aggregated particles obtained in examples and comparative examples.

TABLE 1

|  | Dissolved oxygen amount (mg/L) | Volume average particle size (μm) | Evaluation for volume average particle size | CV value (%) | Evaluation for CV value | Comprehensive evaluation |
| --- | --- | --- | --- | --- | --- | --- |
| Example 1 | Not measured | 1.00 | Good | 35 | Good | Good |
| Example 2 | Not measured | 1.00 | Good | 34 | Good | Good |
| Example 3 | Not measured | 1.00 | Good | 31 | Good | Good |
| Example 4 | 7.5 | 1.47 | Good | 48 | Good | Good |
| Example 5 | 6.9 | 1.21 | Good | 42 | Good | Good |
| Example 6 | 7.2 | 1.30 | Good | 39 | Good | Good |
| Example 7 | 6.8 | 1.08 | Good | 35 | Good | Good |
| Comparative Example 1 | Not measured | 50 | Poor | 42 | Good | Poor |

TABLE 2

|  | Volume average particle size (μm) | Evaluation for volume average particle size | CV value (%) | Evaluation for CV value | Comprehensive evaluation |
| --- | --- | --- | --- | --- | --- |
| Example 1 | 5.1 | Good | 26 | Available | Good |
| Example 2 | 5.4 | Good | 22 | Good | Excellent |
| Example 3 | 5.1 | Good | 27 | Available | Good |
| Example 4 | 6.3 | Available | 30 | Available | Available |
| Example 5 | 5.5 | Good | 28 | Available | Good |
| Example 6 | 5.7 | Good | 23 | Good | Excellent |
| Example 7 | 5.3 | Good | 19 | Good | Excellent |
| Comparative Example 1 | 15.4 | Poor | 53 | Poor | Poor |

Measuring methods for the volume average particle size and the coefficient of variation CV of the resin particles, as we as volume average particle size and the coefficient of variation CV of the aggregated particles in Table 1 and Table 2, and the evaluation standards are as shown below.

[Volume Average Particle Size]

Measurement was conducted by using a particle size distribution measuring apparatus (Microtrack particle size distribution measuring apparatus 9320HRA (X-100), trade name of products manufactured by Nikkiso Co. Ltd.) to determine the volume average particle size based on the volume particle size distribution of the specimen particles.

<Resin Particle>

Good: Volume average particle size is 1.5 μm or less.

Poor: Volume average particle size exceeds 1.5 μm.

<Aggregated Particle>

Good: Volume average particle size is 5.0 μm or more and less than 6.0 μm.

Available: Volume average particle size is 6.0 μm or more and less than 6.5 μm.

Poor: Volume average particle size is less than 5.0 μm, or 6.5 μm or more.

[Coefficient of Variation]

Measurement was conducted by using a particle size distribution measuring apparatus (Microtrack particle size distribution measuring apparatus 9320HRA (X-100), trade name of products manufactured by Nikkiso Co. Ltd.) to determine the volume average particle size and the standard deviation in the volume particle size distribution based on the volume particle size distribution of the specimen particles. Coefficient of variation (CV value, unit; %) was calculated based on the following equation (1).

$$\text{CV value}(\%) = (\text{standard deviation}/\text{volume average particle size}) \times 100 \quad (1)$$

<Resin Particle>

Good: CV value is 50% or less.

Poor: CV value exceeds 50%.

<Aggregated Particle>

Good: CV value is less than 25%.

Available: CV value is 25% or more and 30% or less.

Poor: CV value exceeds 30%.

[Comprehensive Evaluation]

The evaluation standard for the comprehensive evaluation was as described below.

Excellent: Both of volume average particle size and coefficient variation are evaluated as "Good".

Good: Evaluations includes one "Available".

Available: Evaluations includes two "Available".

Poor: At least one of volume average particle size and coefficient variation is evaluated as "Poor".

As shown in Table 1, the resin particles of the examples obtained according to the manufacturing method of the invention have a small diameter and a narrow particle size distribution width, and the aggregated particles obtained by aggregating such resin particles also had a narrow particle size distribution width. By using such resin particles as a toner, since they were uniform in the charging performance and deposited uniformly to electrostatic latent images to form toner images and since they were appropriately reduced in the diameter, images that reproduced original images at a high fineness could be reproduced. Accordingly, by using such a toner, high quality images of high image density and excellent in image quality and image reproducibility could be formed stably.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of manufacturing resin particles, comprising:
a coarsely-pulverizing step of pressurizing a mixture of a molten kneaded product containing a synthetic resin and an aqueous medium containing a surfactant at 15 MPa to 120 MPa and obtaining an aqueous slurry containing coarse particles of the molten kneaded product; and
a finely-granulating step of treating the aqueous slurry containing coarse particles of the molten kneaded product obtained in the coarsely-pulverizing step by a high pressure homogenizer method and finely granulating the coarse particles of the molten kneaded product.

2. The method of manufacturing resin particles of claim 1, further comprising a defoaming step of defoaming the mixture of the molten kneaded product containing the synthetic resin and the aqueous medium containing the surfactant before the coarsely-pulverizing step such that the amount of dissolved oxygen is reduced to 7.5 mg/L or less.

3. The method of manufacturing resin particles of claim 2, further comprising a preliminarily-pulverizing step of obtaining an aqueous slurry containing a molten kneaded product pulverized by preliminarily pulverizing the mixture of the molten kneaded product containing the synthetic resin and the aqueous medium containing the surfactant before the defoaming step such that the particle size of the molten kneaded product is reduced to 500 μm or less.

4. The method of manufacturing resin particles of claim 3, wherein a viscosity improver is added to the mixture in the preliminarily-pulverizing step and the mixture is preliminarily pulverized.

5. The method of manufacturing resin particles of claim 3, wherein the mixture is preliminarily pulverized in the preliminarily-pulverizing step with a colloid mill having a rotor member disposed so as to rotate about predetermined rotational axis thereof and a stator member surrounding the rotor member circumferentially in such a manner that the mixture is caused to pass through a gap between the stator member and the rotor member.

6. The method of manufacturing resin particles of claim 4, wherein the mixture is preliminarily pulverized in the preliminarily-pulverizing step with a colloid mill having a rotor member disposed so as to rotate about predetermined rotational axis thereof and a stator member surrounding the rotor member circumferentially in such a manner that the mixture is caused to pass through a gap between the stator member and the rotor member.

* * * * *